United States Patent [19]

Bushaw et al.

[11] 4,454,575

[45] Jun. 12, 1984

[54] SHARED MEMORY SYSTEM WITH ACCESS BY SPECIALIZED PERIPHERALS MANAGED BY CONTROLLER INITIALIZED BY SUPERVISORY CPU

[75] Inventors: Kenneth A. Bushaw, Longmont; Milton H. Woodward, Boulder, both of Colo.

[73] Assignee: International Business Machines Corporation, Armonk, N.Y.

[21] Appl. No.: 220,637

[22] Filed: Dec. 29, 1980

[51] Int. Cl.³ .......................... G06F 3/00; G06F 13/00; G06F 9/38
[52] U.S. Cl. ..................................... 364/200; 358/256
[58] Field of Search ... 364/200 MS File, 900 MS File; 358/256, 260, 261, 280

[56] References Cited

U.S. PATENT DOCUMENTS

| | | | |
|---|---|---|---|
| 3,283,308 | 11/1966 | Klein et al. | 364/200 |
| 3,558,811 | 1/1971 | Montevecchio et al. | 178/6 |
| 3,560,937 | 2/1971 | Fischer | 340/172.5 |
| 3,751,582 | 8/1973 | Wernikoff et al. | 178/6 |
| 3,909,799 | 9/1975 | Recks et al. | 340/172.5 |
| 3,914,537 | 10/1975 | Perreault et al. | 178/6 |
| 4,067,059 | 1/1978 | Derchak | 364/200 |
| 4,156,798 | 5/1979 | Doelz | 179/15 |
| 4,188,668 | 2/1980 | Finlay | 364/900 |
| 4,231,069 | 10/1980 | Wellendorf et al. | 358/256 |
| 4,268,906 | 5/1981 | Bourke et al. | 364/200 |
| 4,297,727 | 10/1981 | Ogawa et al. | 358/261 |
| 4,305,124 | 12/1981 | Marro et al. | 364/200 |
| 4,319,336 | 3/1982 | Anderson et al. | 364/900 |
| 4,351,025 | 9/1982 | Hall, Jr. | 364/200 |
| 4,371,932 | 2/1983 | Dinwiddie, Jr. et al. | 364/200 |
| 4,385,349 | 5/1983 | Ashford et al. | 364/184 |
| 4,386,416 | 5/1983 | Giltner et al. | 364/900 |
| 4,395,756 | 7/1983 | Daniels | 364/200 |

*Primary Examiner*—James D. Thomas
*Assistant Examiner*—Archie E. Williams, Jr.
*Attorney, Agent, or Firm*—Homer L. Knearl

[57] ABSTRACT

A document distribution terminal can be required to process large volumes of data. To do this rapidly and efficiently, the terminal herein is organized to process all of the data in specialized peripheral devices. A supervising central processing unit (CPU) controls the terminal but does not perform any data processing. The functions of entering data, scanning documents, encrypting data, compressing data, transceiving data, decompressing data, decrypting data and printing data are all performed in parallel by specialized devices working directly with a memory. A peripheral processing controller is initialized by the CPU. The controller then controls time-shared access to the memory by the specialized devices, such as devices used for processing data representing facsimile images.

17 Claims, 19 Drawing Figures

SHARED MEMORY SYSTEM WITH ACCESS BY SPECIALIZED PERIPHERALS MANAGED BY CONTROLLER INITIALIZED BY SUPERVISORY CPU

DESCRIPTION

FIELD OF THE INVENTION

This invention relates to data processing systems where large quantities of data from peripheral devices must be processed. In particular it relates to specialized peripheral devices processing data with their own memory separate from the main processor. One technical area where the invention has particular applicability is document distribution systems (electronic mail).

BACKGROUND ART

In document distribution systems, the document to be transmitted is converted to millions of data bits per page. Document distribution systems may use coded information (CI) or non-coded information (NCI) to electronically send the document image. Whether the data is CI or NCI, it must be processed before it is transmitted. Processing may include data compression to reduce transmission time and data encryption for security purposes. Processing millions of data bits with a central processor to achieve these functions is wasteful and time-consuming.

Known techniques for improving data processing efficiency include time-sharing access by peripheral devices to a central processing unit (CPU) and time-sharing programs in a CPU. One example of such a system is taught in U.S. Pat. No. 3,029,414 issued to H. W. Shrimpf on Apr. 10, 1962. However, this system still processes all the data at the CPU and through the main memory. Therefore it does not lend itself to fast processing of large quantities of raw data from peripheral devices.

Another data processing technique is to time-share access to peripheral devices with two processing units. An example of this system is taught in U.S. Pat. No. 3,560,937 issued to R. P. Fischer on Feb. 2, 1971. The Fischer system could be adapted to handle vast quantities of peripheral data faster than the Shrimpf system simply because it can use two processors to attack the problem. However, all the data is still flowing through a single main memory and the processors at any one instant can only perform two functions since there are only two processors.

A technique for simplifying the access to peripheral devices is shown in U.S. Pat. No. 4,067,059 issued to N. Derchak on Jan. 3, 1978. In this patent the addressing of multiple peripheral devices is controlled by a "Shared Direct Memory Access" device. This does allow fast flexible simpler access to the peripheral devices, but all the processing is still performed by one CPU working with the memory. Accordingly, this system can not handle vast quantities of peripheral data any more efficiently than the Schrimpf system.

In the field of facsimile apparatus (NCI system), stored program control processors have been used to control a facsimile terminal as shown in R. E. Wernikoff et al U.S. Pat. No. 3,751,582. However, the control processing and the data processing both take place in the processor. Therefore, the system can not rapidly process vast quantities of video data without using an expensive and very powerful data processor.

SUMMARY OF THE INVENTION

It is the object of this invention to process large quantities of peripheral data through multiple processes in parallel with the data processing performed by the peripheral devices separate from central processing units.

In accordance with this invention the above object is accomplished by processing the large quantities of peripheral data at the peripheral device level, utilizing specialized peripheral devices operating with a time-shared memory and supervising the system with a central processor. The peripheral devices have hardwired logic, possibly supervised by a microprocessor, to perform specific tasks such as document scan, document print, data compression or decompression, data encryption of decryption and data modulation or demodulation. Each of these devices works directly with a time share memory. Access to the memory is through an adapter between the device and the memory. Control of the access is provided by a controller dedicated to managing memory access by the peripheral devices. The controller and the adapters are initialized by the central processor. The processor only supervises the system, all of the data processing is performed by the peripheral devices.

DETAILED DESCRIPTION

Figure 1:
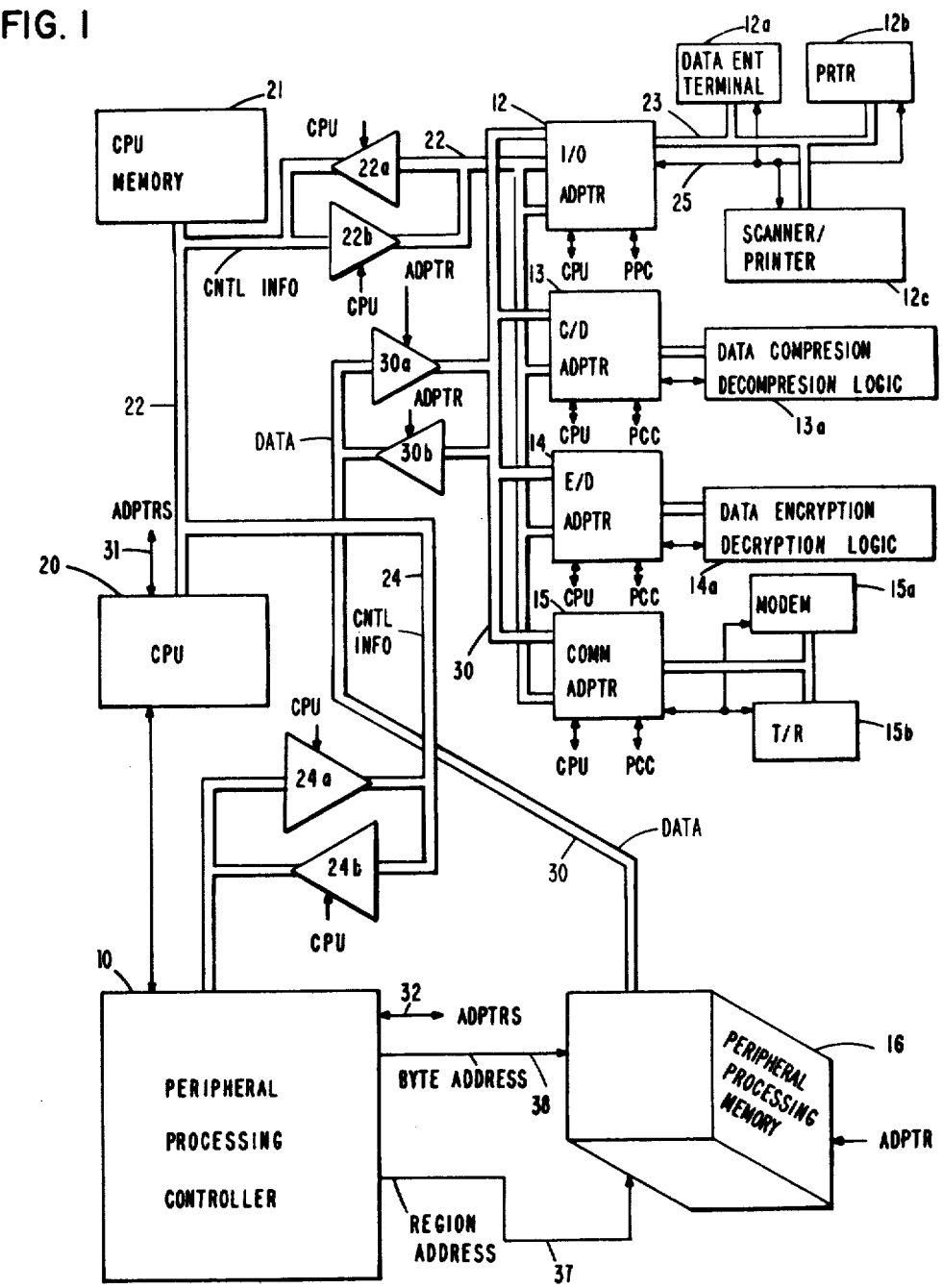
FIG. 1 shows the system of the present invention where data processing is entirely accomplished by peripheral devices working with a peripheral processing memory under control of a peripheral processing controller.

In FIG. 1, controller 10 and peripheral adapters 12, 13, 14, and 15 are initialized by Central Processing Unit (CPU) 20. Thereafter, adapters 12-15 with their peripheral devices (indicated by the same reference numeral as the adapters except for letter suffixes) operate simultaneously to process data directly with the peripheral processing memory 16. Controller 10 contains a plurality of memory address registers (MAR's), end-of-block logic and priority logic for controlling shared use of peripheral memory 16 by devices 12a-c, 13a, 14a, 15a-b.

CPU 20 with its memory 21 supervises the operation of the system. It does not directly process the data in the peripheral system. The CPU sends and receives control information to and from the peripheral adapters over bidirectional bus 22 using drivers 22a and 22b to steer the information flow. Similarly, CPU 20 sends and receives control information to and from peripheral processing controller 10 over bidirectional bus 24 using drivers 24a and 24b to steer the information flow. The control information includes address data, status information, commands, control bits, mode information, etc; it does not include data processed by the peripheral devices 12a-c, 13a, 14a and 15a-b.

In FIG. 1 control buses 22 and 24 and data bus 30 represent information channels which are address controlled. The single lines represent hardwired control or address lines and may represent more than one such line. For example, CPU 20 can send control information to controller 10 or adapters 12-15 over buses 22 and 24 by addressing the information to registers in the controller or the adapters. The single line from the controller 10 labelled to adapters (ADPTRS) represent multiple signal lines such as request, grant and end-of-block. Similarly address lines 37 and 38 are multiple address lines.

In operation, CPU 20 responds to interrupts from the peripheral devices. Using control bus 24 and signal lines 31, CPU 20 sets up MARs in controller 10 with start addresses for a peripheral data processing job. Based on the job to be performed, each device uses a preassigned MAR or is assigned a MAR by CPU 20 over control bus 22. Then CPU 20 releases the peripheral adapters and their peripheral devices to perform their assigned peripheral jobs.

When each peripheral device is ready to process data it requests via a signal line 32 that controller 10 grant it access to peripheral memory 16. Controller 10 grants it access based on predetermined priority logic in the controller. The grant commands are passed back to the peripheral adapters over signal lines 32.

If a peripheral device is granted access, it sends a MAR select and enable signal over lines 32 to activate its assigned MAR in controller 10. Also, it sends a Read/Write command to drivers 30a and 30b and to peripheral processing memory 16 to steer the data flow over data bus 30 from or to memory 16. The peripheral device having access then reads or writes data in peripheral memory 16 over data bus 30.

The peripheral device is assigned a MAR by having its MAR Enable and Select register 40A (inside the device) initialized by CPU 20 through command register 43. The assigned MAR contains the address of the data in peripheral memory 16 that is to be processed by the peripheral device. The address consists of two portions, a region address and a byte address. The region address is passed by region address lines 37 to PPM 16. The byte address is passed by lines 38 and identifies the specific storage location within a region of memory that contains the byte of data to be accessed by the peripheral device.

Each peripheral device processes the data in memory at the address provided by its assigned MAR. Each time device 12a-c, 13a, 14a, 15a or 15b accesses the memory, the address in its MAR is incremented by one so that the device may work its way through a block of data stored in peripheral processing memory 16. After each access, the requesting device with the highest priority is granted the next access by the controller. A peripheral device will keep requesting access to PPM 16 until it gets enough data to process. Thus, the peripheral devices are processing data simultaneously within themselves and are time-sharing access to PPM 16.

The addressing of a block of data in memory 16 is monitored by end-of-block logic in controller 10 so that it knows when a peripheral device has finished processing its assigned data block. The end-of-block conditions are loaded into the controller 10 over the control bus 24 by CPU 20 when the peripheral device job is initialized. The conditions may be the size of the block or the number of accesses by a given peripheral device. When controller 10 detects the end-of-block, it notifies the peripheral device through its adapter with an EOB command. The peripheral device in turn sends an interrupt to CPU 20. This tells the CPU that the peripheral device has completed its assigned job. Alternatively, if initialized to do so, the peripheral device may simply proceed to another job.

The shared peripheral-processing system shown in FIG. 1 is a document distribution system. Input/Output adapter 12 connects a data entry module 12a, a printer module 12b or a scanner/printer module 12c to the system. Bus 23 carries the image data and control commands. Signal lines 25 are hardwired and carry control signals between the modules and the I/O adapter. Each of the modules preferably contain a microprocessor to supervise the print, scan or data entry function. Data entry refers to such functions as card reading, tape reading, optical character reading or keyboard data entry.

The C/D adapter 13 connects data compression or decompression logic 13a to the system. Similarly, E/D adapter 14 connects data encryption or decryption logic 14a to the facsimile system. The compression or encryption functions may be accomplished with any number of algorithms using hardwired logic or microprocessors.

The communication adapter 15 connects the system to one of several communication links. The communication links are represented by modem 15a and transmitter/receiver 15b. Typically the modem will be used to communicate over telephone lines while the transceiver might be used in a satellite communication network.

When initializing this shared peripheral-processing system, CPU 20 can configure the facsimile system to perform multiple peripheral jobs. For example, the system can be initialized in one configuration as a scanner, data compressor, data encryptor, and data transmitter. Then facsimile scan data will be processed through peripheral memory 16 in pipeline fashion. In another configuration, the system can be initialized as a receiver, data decryptor, data decompressor and printer.

In this configuration facsimile print data is processed through peripheral memory 16 in pipeline fashion.

Figure 2:
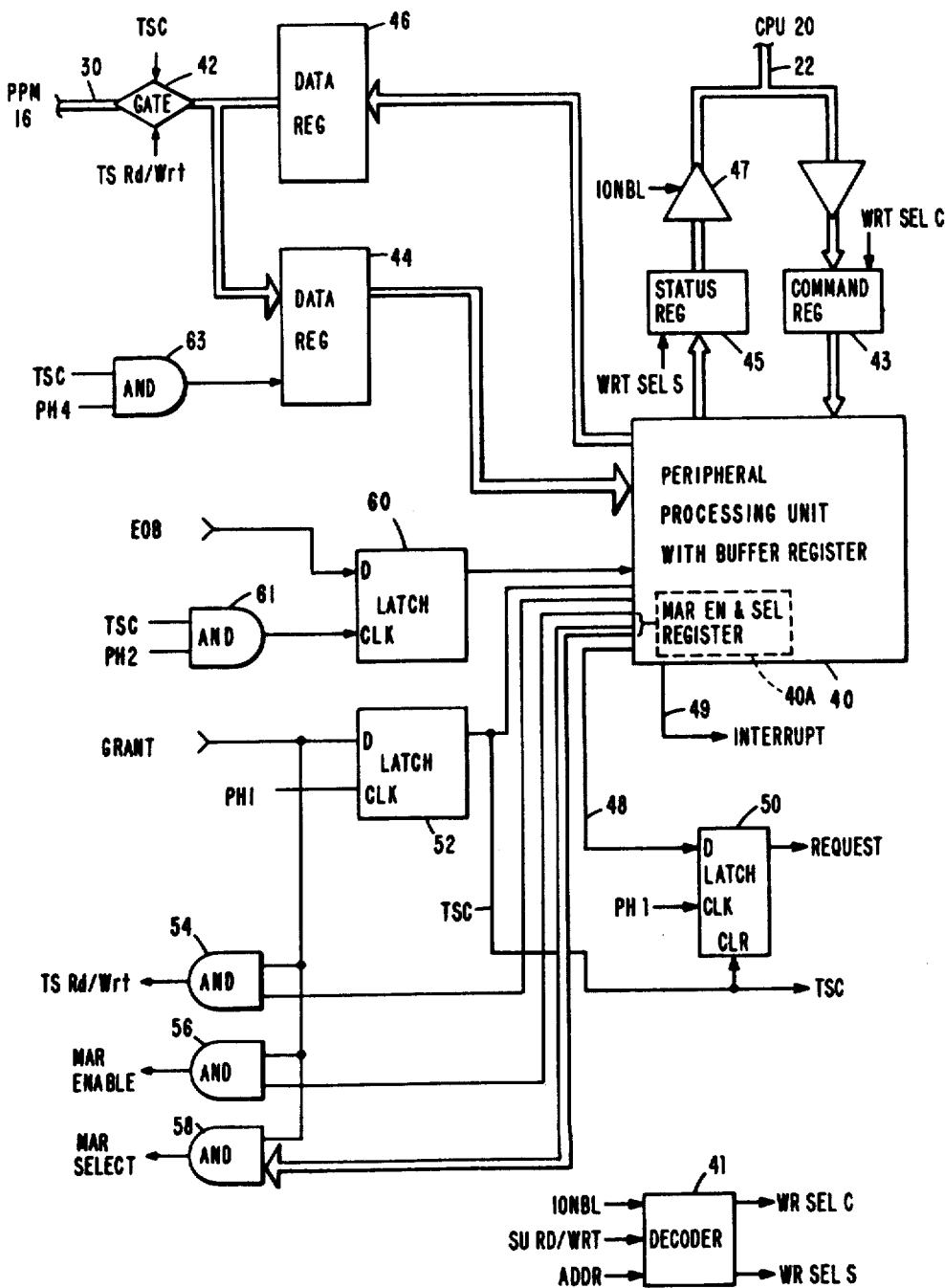
FIG. 2 shows the adapters used in FIG. 1.

Referring now to FIG. 2, a general schematic showing the preferred configuration of a peripheral adapter is shown. The peripheral device or processing unit 40 and its included buffer registers are not shown in detail. The processing unit would assume different configurations depending upon the peripheral function to be performed. For example, if FIG. 2 represented the scanner/printer peripheral adapter 12 of FIG. 1, then the peripheral processing unit would have to contain a scanning mechanism, logic to process the scan data, and buffer storage to buffer the data until it was ready for transmission to the peripheral processing memory 16 of FIG. 1. Also, the unit 40 if representative of the scanner/printer device 12c would have to include a paper handling mechanism and a printing mechanism plus the buffer storage for print data and print data processing electronics drive the print head.

If the peripheral processing unit 40 represented compressor/decompressor 13a or the encryptor/decryptor 14a, it would simply consist of logic with buffer storage sufficient to store the quantity of video data being compressed/decompressed or encrypted/decrypted. Similarly, if peripheral processing unit 40 represented the transmitter/receiver 15 of FIG. 1, it would have to include a modulation/demodulation device to transmit or receive data as well as logic and buffer storage to organize the data for transmission/reception.

Thus, FIG. 2 generally represents any type of adapter in FIG. 1 and describes how such a peripheral adapter is attached to the system of FIG. 1. Control data from CPU 20 goes directly to the peripheral processing unit 40 over the bus 22. When the CPU wishes to send control information to the processing unit 40, it sends a supervisory read/write signal (Su Rd/Wrt) and the address of the adapter's command register 43 to the adapter. Decoder 41 in the adapter resonds to the address and the Su Rd/Wrt signal and generates the write select C signal (WRT SEL C). This signal enables command register 43 to receive and store the control information over bus 22.

When CPU 20 wishes to check the status of the peripheral processing unit (PPU) 40, it addresses status register 45. The CPU sends decoder 41 a IONBL signal, a Su Rd signal and the address of the status register 45 at the adapter. Decoder 41 generates the Wrt Sel S signal to gate status information from the PPU 40 into status register 45. The IONBL signal then gates driver 47 to pass the information in status register 45 back to CPU 20.

If the PPU wishes to contact the CPU 20, it sends an interrupt signal over signal line 49. The CPU will check the contents of status register 45, as described above, looking for an interrupt status bit. If the bit is present, it confirms that the device was the source of the interrupt signal.

The above described flow of information to PPU 40 has been control information. Data to be processed comes from the peripheral processing memory PPM 16 over bus 30 through bi-directional driver gate 42. Data read from the memory is stored in register 44 before it is loaded into the peripheral processing unit 40. Data to be written into the peripheral memory 16 is stored in data register 46 while it waits to be gated to the memory 16. Gate 42 is controlled by the Read/Write command for steering and by the time share cycle (TSC) signal which enables the gate 42.

After peripheral processing unit 40 has been initialized by commands from CPU 20 over bus 22, the first operation is to request access to memory 16. Processing unit 40 when it wishes access, generates a request signal on line 48 to latch 50. At the next PH1 clock signal, latch 50 is set. Its output is the request signal sent over one of the signal lines 32 (FIG. 1) to the peripheral processing controller 10.

Figure 3A:
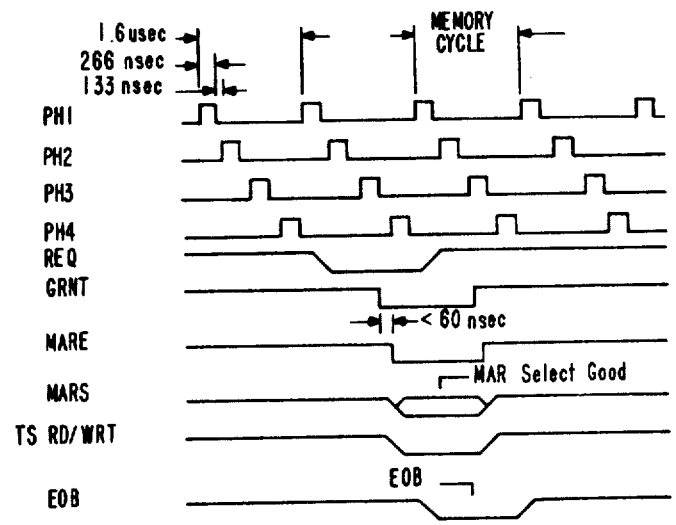
FIGS. 3A and 3B show the timing of signals used in the system.
Figure 3B:
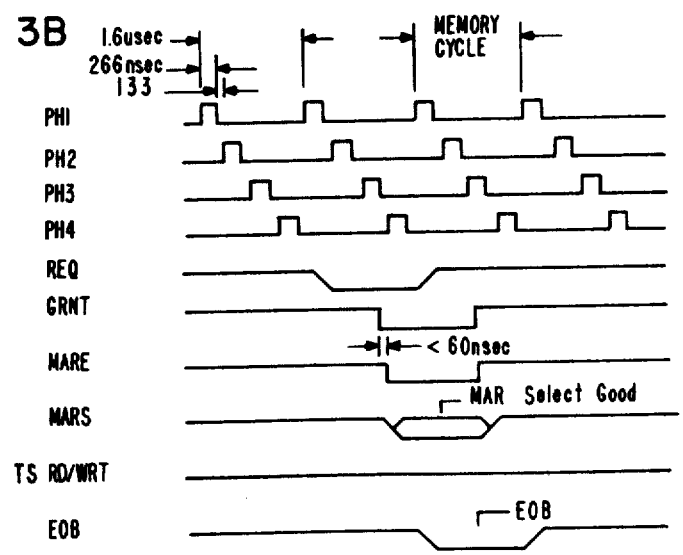

The signals used in FIG. 2 are diagrammed in FIGS. 3A and 3B. FIG. 3A shows a typical write operation, while FIG. 3B shows a read operation. The clock signals have four phases, PH1 through PH4. A single memory cycle is measured from the rising edge of a PH 1 clock pulse to the rising edge of the next PH 1 clock pulse. The presence of a request signal out of latch 50 is shown in FIG. 3A as a pulse REQ that shifts from a higher level to a lower level starting at one PH1 clock pulse time and terminating at the next PH1 clock pulse time.

Figure 6:
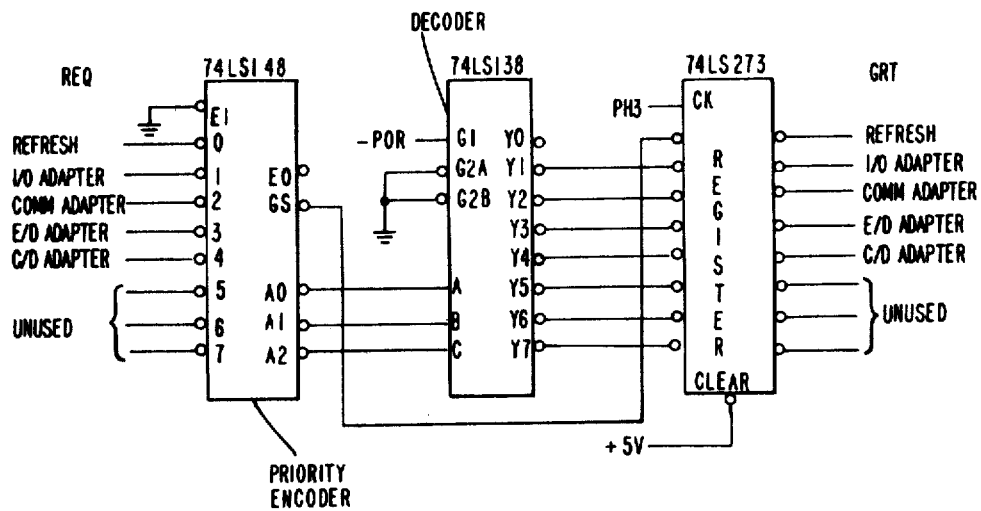
FIG. 6 shows the priority circuits in the peripheral processing controller which respond to requests from the peripheral devices and generate grants of access to the peripheral processing memory.

As shown in FIG. 6, the grant signal, received back from the peripheral processing controller 10 (FIG. 1), is generated at PH3 time. The grant signal stays on until the next PH3 clock pulse. the circuit modules in FIG. 6 are available from Texas Instruments as part numbers 74LS148, 74LS138 and 74LS273. Module 74LS148 is a priority encoder and will have a 3 bit output on lines A0, A1 and A2 representative of the highest priority of the 0–7 inputs. The highest priority is assigned to input 0 and descends to the lowest priority being assigned to input 7. The three bit output is the binary representation of the input line with the highest assigned priority that has a request signal present. For example, if inputs 1, 2 and 4 have a request signal present, the output on A0, A1 and A2 is 001. If requests had been present on inputs 3 and 4, the output would be 011 for input 3.

Decoder 74LS138 simply converts the 3 bit word from encoder 74LS148 back into a single line output. In other words only one of the lines Y0–Y7 has a signal output depending upon the 3 bit word input from A0, A1 and A2. The G1, G2A and G2B inputs are enabling inputs. So long as there is no power-on-reset signal on G1, and inputs G2A and G2B are grounded, decoder 74LS138 is enabled.

The one line of Y0–Y7 that has an output will set its associated stage in register module 74LS273 at PH3 clock time. The clear input to the module is held at +5 volts to enable the register. If the +5 volts is not present, the register is cleared. The stage, that is set at PH3 clock time, has a grant output that is sent back to its associated adapter or to the memory refresh apparatus (not shown). At the next clock cycle the PH3 pulse will reset that stage in the register unless the priority encoder and decoder modules still indicate that same request represents the highest priority request.

In FIG. 2, the grant signal is received by the latch 52. Latch 52 will set at PH1 time when the grant pulse is present. The output of latch 52 is the time shared cycle (TSC) signal. The TSC signal enables gate 42 to connect the data bus 30 to the data registers 44 and 46 and clears the request latch 50. The TSC signal also notifies the processing unit 40 that the request for access has been granted.

When peripheral processing unit 40 activates its request signal, it generates the Read/Write signal which is applied to AND gate 54. The peripheral processing unit 40 also generates a MAR Enable signal and a MAR Select signal. These signals are applied to AND gates 56 and 58, respectively. AND gates 54, 56 and 58 are all enabled by the grant signal received back from the peripheral processing controller 10 (FIG. 1).

The MAR Enable and MAR Select signals are passed to the processing controller 10 in FIG. 1. The Read/-Write signal from AND gate 54 is used to steer data through the gate 42 (FIG. 2), drivers 30A and 30B (FIG. 1), and to control the Read/Write function of peripheral processing memory 16.

If the operation is a Write operation, then the TS Read/Write signal will be a negative-going pulse remaining active as long as the grant signal is active (see FIG. 3A). During this Write pulse, data flows from data register 46 through gate 42 and through driver 30B (FIG. 1) to PPM 16.

The process of request, grant, MAR select and memory addressing continues until the peripheral processing controller 10 in FIG. 1 indicates the end of a block of data has been reached. At that time, the controller 10 generates the EOB (end-of-block) signal which is received in FIG. 2 by latch 60. When the EOB signal is present, the latch is set by the PH 2 signal passed by AND 61. AND 61 is enabled during the time share cycle by the TSC signal. The set condition of latch 60 signals peripheral processing unit 40 that end-of-block has been reached. The latch is reset at the next PH 2 clock signal.

Figure 4:
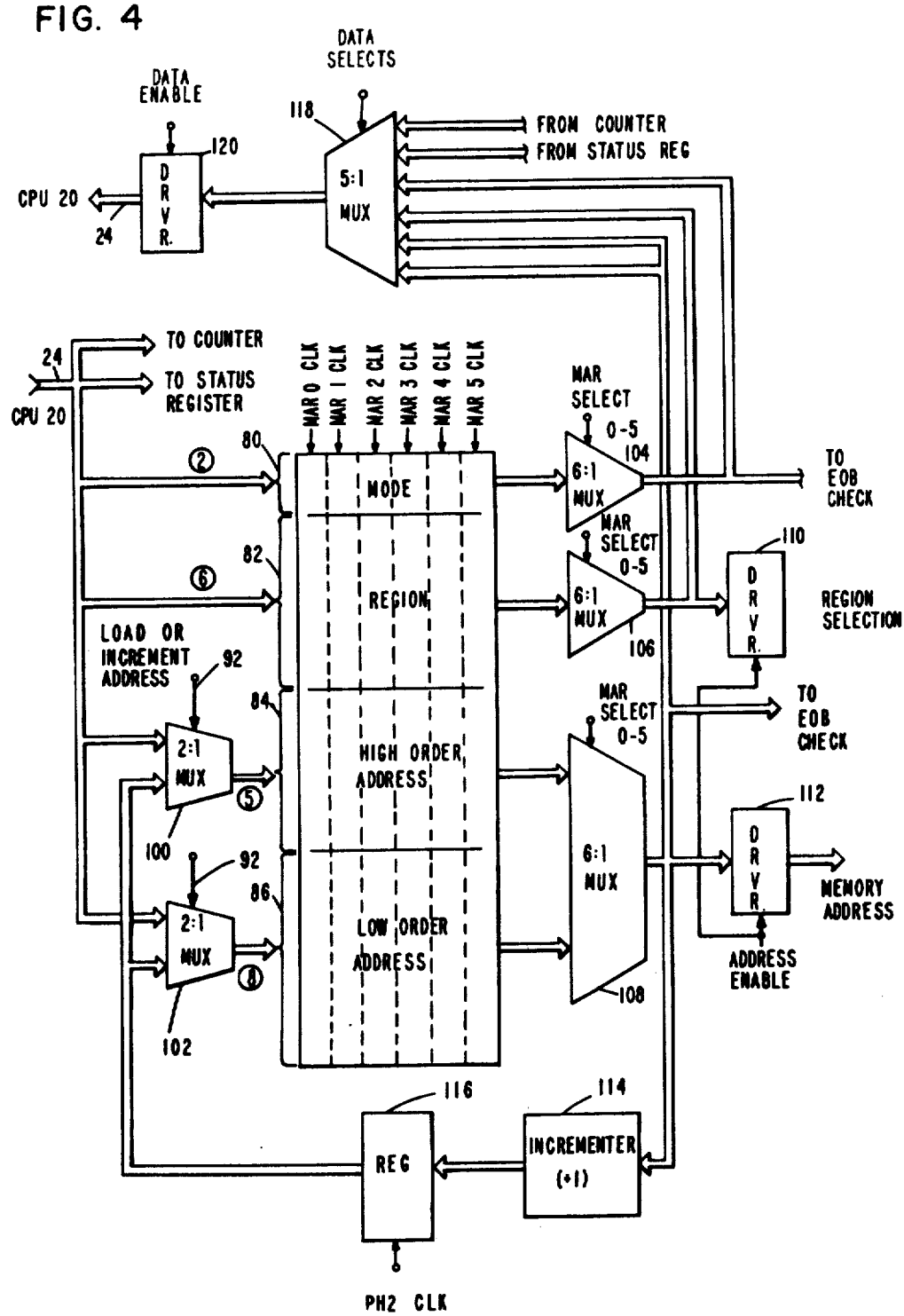
FIG. 4 shows the portion of the peripheral processing controller containing the MAR's.
Figure 5:
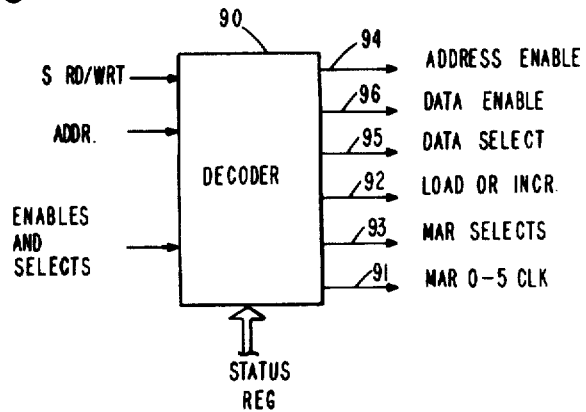
FIG. 5 shows the command decoder in the peripheral processing controller which decodes commands from the supervisory CPU.
Figure 7:
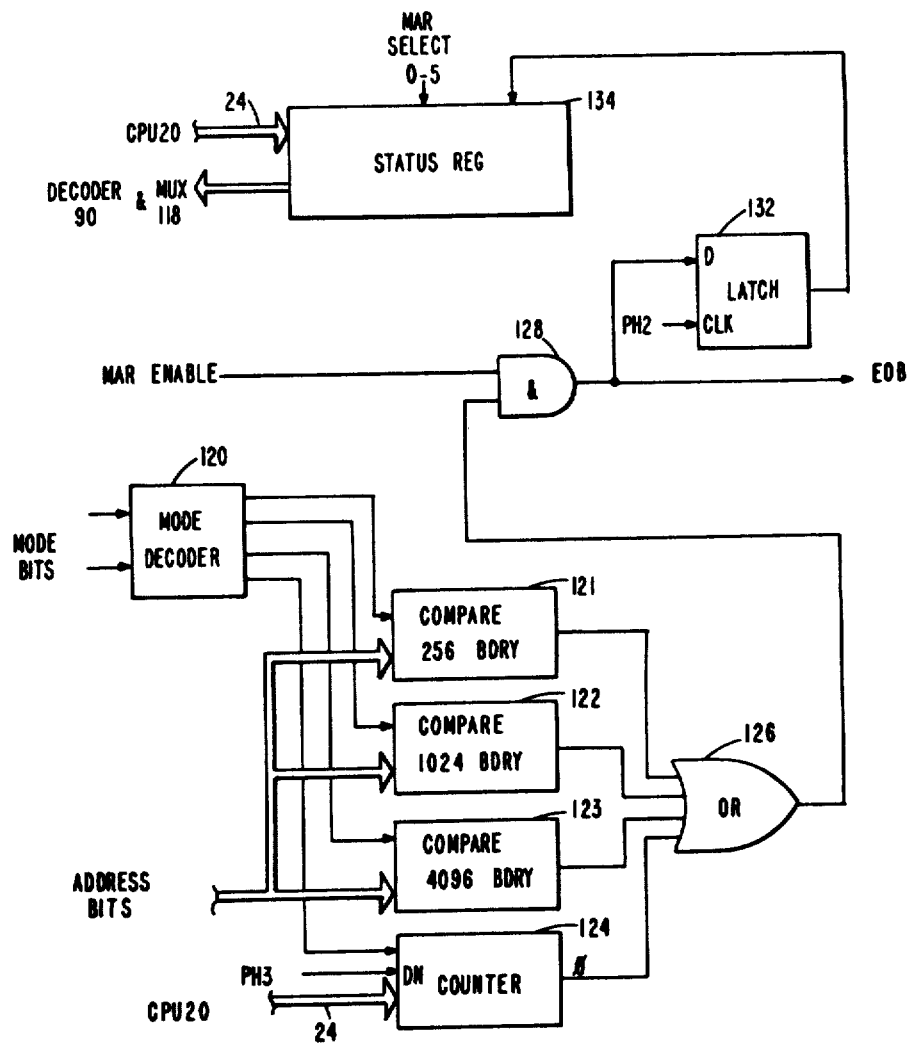
FIG. 7 shows the end-of-block detection apparatus in the peripheral processing controller.

The peripheral processing controller 10 of FIG. 1 is shown in detail in FIGS. 4, 5, 6, and 7. FIG. 4 shows the memory address registers (MARs) and the multiplex switches for gating address and mode information in and out of the MARs. FIG. 5 shows the decoder that decodes the commands from the CPU or the addresses from the enable and select lines from the peripheral adapters. The decoder generates the commands used throughout the peripheral processing controller. FIG. 6 shows the priority modules which receive requests and issue grants. FIG. 7 shows the end-of-block apparatus that generates the EOB signal which is sent back to the peripheral adapter.

As shown in FIG. 4, the memory address registers (MARs) are divided into four sections, mode 80, region 82, high-order address bits 84, and low-order address bits 86. There are six MARs, MAR0 through MAR5. The mode, region, high-order address, and low-order address sections contain 2, 6, 5 and 8 bits, respectively. In effect, there are six memory address registers each containing 21 bits, two mode bits, six region bits, and thirteen address bits. These MARs are initialized by CPU 20 loading in bytes of control and address information over control bus 24.

The first byte of eight bits is loaded into the mode and region sections of the MAR addressed by CPU 20. Which MAR is addressed is decoded by decoder 90 in FIG. 5. The decoder 90 will respond to an address signal over bus 24 from CPU 20 and generate a MAR 0–5 Clock signal 91 which will select one of the MARs 0–5. Accordingly, the first byte of eight bits is loaded into the register sections 80 and 82 because the CPU sends an address command to decoder 90 in FIG. 5 that causes the decoder to generate one of the MAR 0–5 Clock signals. Five of the eight bits in the second byte are similarly loaded into the MAR section 84. These bits are the high-order address bits specifying an address in peripheral processing memory 16. Finally, the third byte is loaded into the MAR section 86. The third byte contains the low-order eight bits specifying an address in PPM 16. In this way, CPU 20 initializes the six MARs by addressing each MAR, which address is decoded into a MAR clock signal, and loading three bytes of address and control data over bus 24.

For the second and third bytes which contain the high-order and low-order address bits, the CPU 20 must also send a load command. Decoder 90 will then generate the load command over line 92 so that the multiplexers 100 and 102 will pass the bits of the address bytes to the MAR sections 84 and 86. As discussed hereinafter, multiplexers 100 and 102 may be switched to the increment address mode by the CPU 20 after the MAR groups 84 and 86 have been initialized. The increment mode is used to increment the address bit each time a peripheral device is given access. Thus, after initialization, the peripheral devices will work their way through a block of data as addressed by the incremented addresses in the MAR sections 84 and 86.

After all of the MARs have been initialized, and the MAR Enable and Select register 40A (FIG. 2) in each peripheral device has been initialized, CPU 20 signals each peripheral processing unit (PPU) 40 to begin its job. Each PPU requests access. If its request is granted peripheral, processing unit 40 then sends out the MAR Enable signal and the MAR Select signal from register 40A to the controller 10 (FIG. 1). Decoder 90 in FIG. 5 is inside the controller 10 and decodes the enable and select signal to generate the MAR Select 0–5 signal 93. Each peripheral device after being initialized selects its assigned MAR in this manner.

The MAR Select 0–5 signal gates the multiplexing switches 104, 106 and 108. Multiplexing switch 106 passes the region address to the peripheral processing memory 16 (FIG. 1). Multiplexer 108 passes the high and low order address bits to the peripheral processing memory. The region selection and address bits go to the memory when the drivers 110 and 112 are enabled by the decoder 90 in FIG. 5. Decoder 90 generates the address enable signal 94 in response to the enable and select signals from the peripheral device.

At the same time that the address bits are supplied to the peripheral processing memory, they are also fed back to the incrementer 114. Incrementer 114 adds one to the address. At Ph 2 clock time the incremented address is then stopped in register 116. When the increment address signal 92 comes from the decoder 90, the incremented address in register 116 is stored back into sections 84 and 86 of the selected MAR. In this way, the address in a MAR is advanced by one to the next address position each time the peripheral device accesses the memory.

Also shown in FIG. 4, is the multiplexing switch 118 and the driver 120. Multiplexing switch 118 and driver 120 are controlled by the decoder in FIG. 5 in response to commands from the CPU 20. When CPU 20 wishes to check the status of the MARs, it sends a command to the controller which is decoded by decoder 90 (FIG. 5). Decoder 90 generates a Data Select signal 95 to switch multiplexer 118 and a Data Enable signal 96 to activate driver 120. The selected data is gated through the multiplexing switch 118 and is driven by driver 120 on to bus 24 back to the CPU.

The only remaining function in the controller 10 (FIG. 1) is the end-of-block (EOB) detection. This apparatus is shown in FIG. 7. The end-of-block checking apparatus has four different modes of operation. The mode bits stored in the MAR register group 80 in FIG. 4 control the mode of operation of the end-of-block checking apparatus.

When a selected MAR is read out through the multiplexers 104, 106 and 108 in FIG. 4, the two mode bits from that MAR are passed to the mode decoder 120 in FIG. 7. Decoder 120 decodes the two bits into one of four possible mode conditions and enables one of the comparators 121 through 123 or counter 124.

The comparators 121 through 123 also receive the low order address bits from the selected MAR. From these address bits, these comparators look for a boundary condition indicating the end of a block of data in memory.

Comparator 121 looks for an address position 255. Comparators 122 and 123 look for address positions 1,023 and 4,095 respectively. These comparators are monitoring the lowest order address bits for an all ones condition. Comparator 121 looks for the eight lowest order bits to be all ones; comparator 122 looks for the ten lowest order bits to be all ones; and comparator 123 looks for the twelve lowest order bits to be all ones. When a MAR is selected and its mode bits enable one of the comparators 121 through 123, that comparator will check to see if the MAR is addressing the boundary condition that the comparator is looking for. If it is, an end-of-block (EOB) signal from the selected comparator is passed by OR 126 to AND gate 128.

The fourth mode that the end-of-block apparatus may use is to count the number of accesses to the memory. If the MAR has mode bits indicating this mode, then counter 124 is enabled by the decoder 120 each time that MAR is selected during a memory access cycle. Counter 124 is loaded by CPU 20 over bus 24 with a count specifying the number of accesses necessary to process a data block. At the same time, the MAR would be set up by the CPU 20 with the initial address starting the block. Each time the MAR using this fourth mode bits is selected, the mode decoder 120 in FIG. 7 will enable the counter 124 to receive a PH 3 clock pulse to count the counter down. When the counter 124 is counted down to zero, the end of the block condition has been reached. The zero condition from counter 124 is collected by OR 126 and also passed to AND 128.

The end-of-block condition out of OR 126 is passed by AND gate 128 after MAR Enable is active. There will be a MAR Enable during each time share access. If there is an end-of-block condition detected during the period when the MAR Enable signal is active, then the EOB signal is sent to the peripheral adapters. Then the peripheral device having access detects the EOB signal.

The end-of-block signal is also used to set latch 132. Latch 132 is set at PH 2 clock pulse time when the EOB signal is present. Latch 132, in turn, loads an EOB bit condition into the status register 134. Each stage of the register 134 is associated with one of the six MARs in FIG. 4. Accordingly, if an end-of-block condition is detected for that MAR, an EOB bit is loaded into that stage of the status register 134 associated with the MAR.

When a stage of the status register 134 is set, it indicates to the decoder 90 in FIG. 5 that a particular MAR has reached an end-of-block condition. The decoder inhibits the selection of that MAR thereafter until the MAR is again initialized and the status register stage for that MAR is reset by CPU 20.

Figure 8:
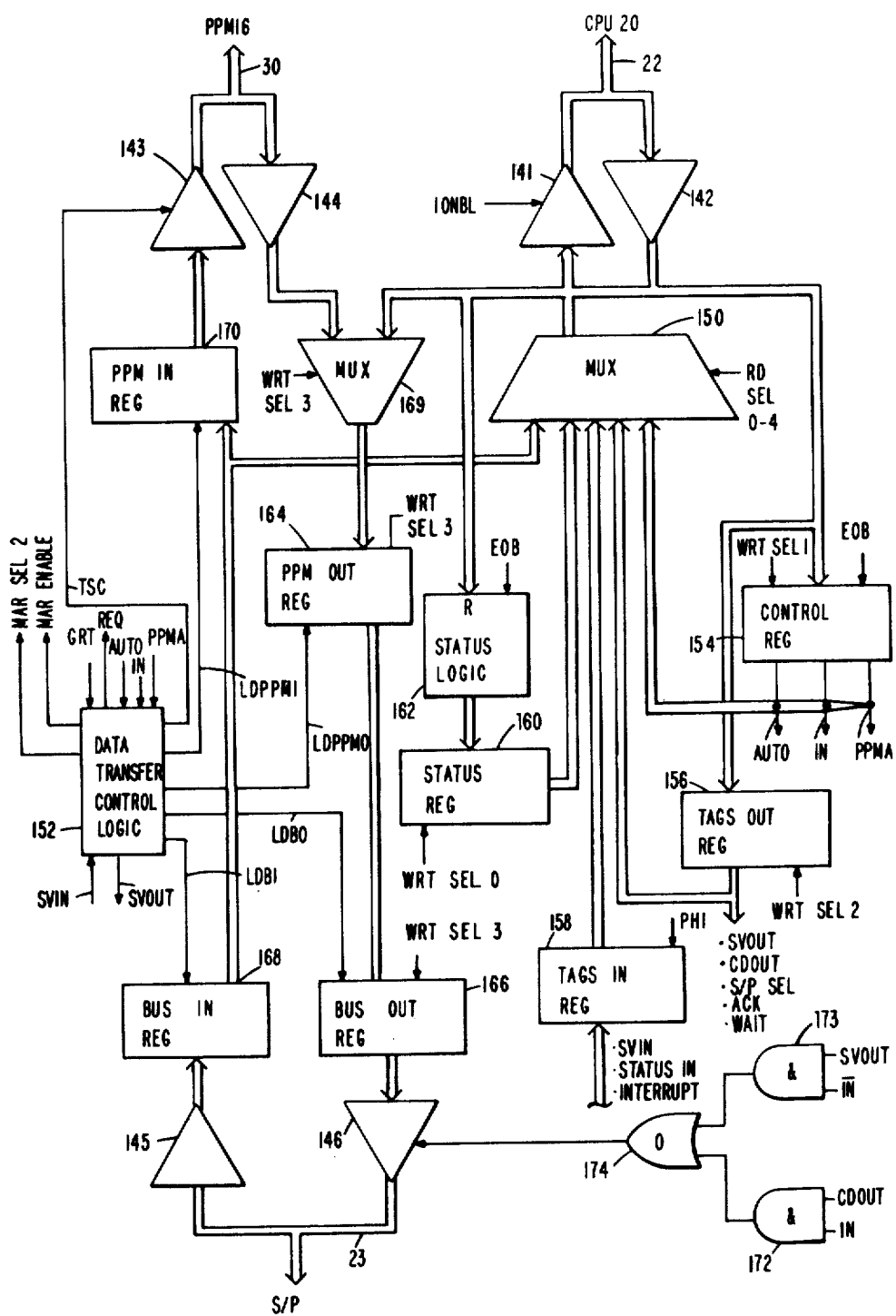
FIG. 8 shows the I/O adapter 12 in the system of FIG. 1.

Referring now to FIG. 8, a more detailed example of a specific adapter is shown. In particular, the adapter of FIG. 8 is the I/O adapter 12 that connects the data entry, scanner and printer modules 12a–12c with the system of FIG. 1. The control channel 22 connects to the adapter via drivers 141 and 142. The data channel 30 connects the adapter to the peripheral processing memory 16 (FIG. 1) via the drivers 143 and 144. The scanner and printer modules are connected to the adapter via bus 23 through drivers 145 and 146. The other input/output lines labeled in FIG. 8 are control lines connected between the adapter and the CPU 20 or between the adapter and the scanner/printer modules. Exceptions are the read and write select signals which are generated by the decoder 148 in FIG. 9.

The inputs to decoder 148 are signal lines from the CPU 20. Decoder 148 in FIG. 9 generates the Read Select 0–4 signals used to control the multiplexing switch 150 in FIG. 8 when reading information from the adapter or scanner/printer modules to CPU 20. Write Select 0–3 lines are generated by decoder 148 (FIG. 9) when CPU 20 wishes to write control information into four selectable registers in the adapter.

The I/O Adapter of FIG. 8 may be viewed as a device having two modes of operation, automatic and supervised. The supervised mode is under control of CPU 20. In this mode, CPU 20 loads address and control information into the I/O Adapter and the scanner/printer modules. The automatic mode of operation is used for direct transfer of data between the scanner/printer modules and the peripheral processing memory 16. It is under the control of data transfer logic 152.

Examining the supervised mode of operation first, the CPU 20 sets up the control register 154, the TAGS OUT register 156, the TAGS IN register 158 and the status register 160. Control register 154 contains bits indicating the mode of operation of the adapter, the direction of data flow in or out relative to the PPM 16 or the CPU 20, and whether space in the PPM is available (PPMA). These signal bits are gated into control register 154 by the WRT SEL 1 signal from decoder 148.

The TAGS OUT register 156 contains digital bits which represent control data. The TAGS OUT register may contain a service out (SVOUT) bit, a command out (CDOUT) bit, an acknowledge (ACK) bit, a WAIT bit or a scanner/printer select (S/P SEL) bit. These bits are loaded in from CPU 20 when a WRT SEL 2 signal from decoder 148 gates register 156. The TAGS IN register 158 may contain the service in (SVIN) bit, an INTERRUPT bit or a STATUS IN bit. These signals come from the scanner/printer module and, if present, are loaded in register 158 by a PH1 clock pulse every clock cycle.

Figure 9:
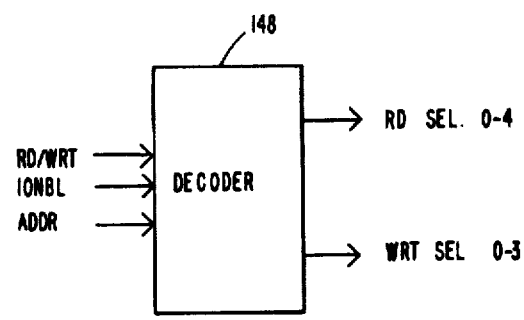
FIG. 9 shows a command or address decoder used in the adapter of FIG. 8.

The status register 160 is set by the WRT SEL 0 signal from decoder 148 (FIG. 9). The status register will contain bits indicating the EOB (end-of-block) signal has been received or may contain bits indicating various error conditions. The detection of error conditions is not a part of the invention and is accordingly not discussed further herein. Resetting of the status register is controlled by the status logic 162 which responds to the EOB signal from the peripheral processing controller 10 (FIG. 1) and to initialization conditions from CPU 20.

CPU 20 may also write control information to a scanner/printer module via the PPM OUT register 164 and the BUS OUT register 166. These registers, along with the multiplexing switch 168, are all selected by a WRT SEL 3 signal from decoder 148 (FIG. 9). Thus, when a WRT SEL 3 signal is present there is a straight connection from CPU 20 through to BUS OUT register 166 via the multiplexing switch 168 and PPM Out register 164.

The control information is gated to a scanner/printer module by driver 146 when a command out (CDOUT) signal and an IN signal are present. The scanner/printer module to receive the control information is addressed by the scanner/printer select address (S/P SEL) from the TAGS OUT register 156.

Control information at a scanner/printer module may be read back to CPU 20 via the BUS IN register 168 and the multiplexing switch 150. The information is gated back to CPU 20 by first loading it into the BUS IN register 168. The CPU then signals decoder 148 to bring up the RD SEL signal to pass the information from BUS IN register through multiplexing switch 150.

The PPM IN register 170 is not used during the supervised mode. Register 170 is used to buffer video data information between the BUS IN register and the peripheral processing memory 16. Its function will be described hereinafter when the AUTO mode operation is explained.

The operation of the adapter in FIG. 8 will be explained by going through typical supervised and automatic operations. The supervised operations refer to conversations between CPU 20 and a scanner/printer module. Automatic operations refer to data flow between the scanner/printer module and the peripheral processing memory 16.

As a first example, CPU 20 will set up control information in one of the scanner/printer modules. The CPU first sends a signal, which is decoded by decoder 148 as WRT SEL 1, and loads in control information into the control register 154. The control information in this example would be not-AUTO mode, not-IN mode and PPMA (Peripheral Processing Memory Available). Next, CPU 20 generates a WRT SEL 2 signal and loads the TAGS OUT register 156 with the S/P SEL bit for the scanner/printer module to which control data is to be sent. Then CPU 20 generates the WRT SEL 3 signal and puts the control data into the BUS OUT register 166 via the multiplexing switch 168 and the PPM OUT register 164.

Next, CPU 20 loads a CDOUT bit to the TAGS OUT register 156 with the WRT SEL 2 signal. The CDOUT bit is at a different position in the register from the S/P SEL bit. To preserve the S/P SEL bit, the bit may be rewritten into the TAGS OUT register at the same time as the CDOUT bit. Alternatively, only the CDOUT bit may be written.

With the CDOUT bit present in the TAGS OUT register, the CDOUT line at AND gate 172 is on and the IN line for AND gate 172 is on. Therefore, AND 172 has an output which is passed by OR 174 and enables driver 146. The control data in register 166 is then passed by the driver 146 to the scanner/printer module selected by the S/P SEL bit.

When the scanner/printer module receives the control data, it responds with a STATUS IN signal to register 158 and a status information byte back over bus 23 to the BUS IN register 168. Driver 145 simply passes the information from bus 23 into the BUS IN register 168. A read select signal from the CPU switches MUX 150 to pass the BUS IN register contents to CPU 20 through the driver 141. Driver 141 is enabled by an I/O enable (IONBL) command from CPU 20 when it wishes to read the information.

The scanner/printer module notifies CPU 20 about the presence of status information by raising a STATUS IN bit in the TAGS IN register 158. When the CPU 20 reads the STATUS IN bit through MUX 150 from the TAGS IN register 158, it will next switch the MUX to read in the BUS IN register contents. When the CPU 20 has received the status information it acknowledges the status information by dropping the CDOUT bit in the next clock cycle. CPU 20 resets the CDOUT bit in the TAGS OUT register 156. This drops the CDOUT signal and signals the scanner/printer module that the status information was received by the CPU.

The above-described process is the manner in which the CPU 20 communicates with the scanner/printer modules to set up the modules for a processing operation. This sequence is initiated by the CPU 20. The scanner/printer modules can initiate communication with CPU 20 by raising an INTERRUPT bit.

The interrupt operation occurs when the scanner/printer module detects it has completed the job assigned to it by the CPU 20. For example, it may have detected the end of a scan line or a print line, or it may have processed all of the data in a block of the peripheral processing memory 16 and received the end-of-block signal back from the controller 10 (FIG. 1). The interrupt operation starts with the printer or scanner module raising the INTERRUPT tag. The INTERRUPT bit is set in the TAGS IN register 158 at PH1 clock time. When CPU 20 reads the registers and detects the INTERRUPT tag, it will respond with an ACKNOWLEDGE tag in the TAGS OUT register 156.

When the scanner/printer module sees the ACKNOWLEDGE tag in the TAGS OUT register 156, it drops the INTERRUPT tag. Thus at the next PH1 clock time, the INTERRUPT bit in the TAGS IN register 158 is reset. The next time the CPU 20 checks the TAGS IN register and sees that the INTERRUPT tag has dropped, it again responds with an ACKNOWLEDGE tag in the TAGS OUT register. This completes the interrupt operation.

The scanner/printer module may also signal termination of a data transfer operation. To do this, the module places status information in the BUS IN register 168 and raises the STATUS IN bit. CPU 20 reads the STATUS IN bit in register 158 and reads out the status information via the multiplexing switch 150. CPU 20 then raises the SVOUT bit in register 156 to signal receipt of the status information. The scanner/printer module then drops STATUS IN, and the CPU thereafter drops SVOUT. TAGS IN register 158.

So far, the adapter in FIG. 8 has been described in the supervised mode of operation where the CPU 20 controls the adapter and talks to the scanner or printer module. In the automatic mode of operation, the adapter is controlled by the data transfer control logic 152. In this mode of operation, data flows between the peripheral processing memory 16 and the scanner or printer module.

In the automatic (AUTO) mode the only registers used are the PPM IN register 170, the PPM OUT register 164, the BUS IN register 168 and the BUS OUT register 166. The PPM OUT register and the BUS OUT register act as a two-step buffer when data is flowing from PPM 16 to a printer module. Likewise, the BUS IN register 168 and the PPM IN register 170, act as a two-step buffer when video data is flowing from a scanner module to PPM 16. Using a two-step buffering arrangement is not mandatory, but it does reduce the likelihood that a scan/print operation will be interrupted because of data flow interruption.

Figure 10:
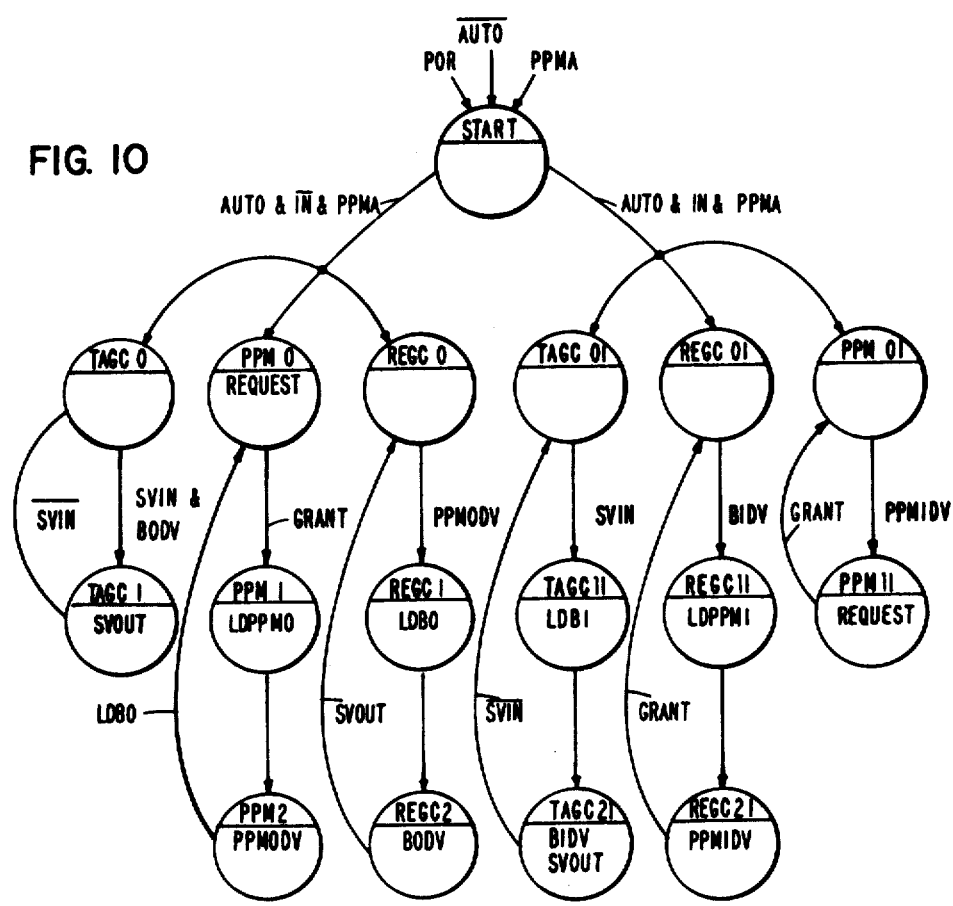
FIG. 10 shows the logic states of the data transfer control logic 152 in the adapter of FIG. 8.

The gating of data through the in registers 168 and 170 or through the out registers 164 and 166 is controlled by the data transfer control logic 152. The operation of this logic is best understood by referring to FIGS. 8 and 10 simultaneously. FIG. 10 is a state diagram for the data transfer control logic 152. In FIG. 10, the states are represented by circles. The condition that cause a change in state are indicated on the connection lines between the circles. If there is no condition indicated, the logic will automatically transition from one to the next state during the next clock cycle. Otherwise, the logic will transition from one to the next state upon the occurrence of the condition and the clock cycle.

In the state diagram, the right hand half of the diagram corresponds to the operation when data is flowing into the PPM. The left hand half of the state diagram shows the states when data is flowing out of the PPM and in to the scanner or printer module. In each of these halves, the tag control (TAGC) states, the PPM data gating (PPM) states and the register control (REGC) states are arranged in columns and operate in parallel as their conditions are satisfied.

Referring now to FIGS. 8 and 10, the I/O adapter operates in the AUTO mode in the following manner. The start state is entered when a POR (power on reset) signal, a PPMA signal or not-AUTO mode signal is present. When the auto mode condition is present, the logic will branch right or left in the state diagram, depending on whether the data flow is into the PPM or out of the PPM, respectively. If the data flow is to be in to the PPM, then the states Tag Control 0 In (TAGC0I), Register Control 0 In (REGC0I), and PPM 0 In (PPM0I) are entered. When the scanner module generates the service in signal (SVIN), logic 152 transitions to state TAGC1I. In this state, the Load Bus In (LDBI) signal is generated, and the video data is loaded into BUS IN register 168.

In the next cycle, state TAGC2I is entered. In this state, the Bus In Data Valid (BIDV) signal and the SVOUT signal are generated. The SVOUT signal goes back to the scanner module to acknowledge the loading of the BUS IN register. The BIDV signal is the condition which causes the logic to pass from state REGC0I to REGC1I. In state REGC1I the Load PPM IN signal (LDPPMI) is generated.

The LDPPMI signal is used to gate the PPM IN register 170. When this signal is present, the contents of the BUS IN register 168 is transferred to the PPM IN register 170. In the next clock cycle, logic 152 passes from state REGC1I to REGC2I and generates the PPM IN Data Valid (PPMIDV) signal. At the same time, the SVOUT signal, which was previously generated in state TAGC2I, is acknowledged by the scanner module dropping the service in signal (SVIN). When SVIN drops, the tag control logic moves from state TAGC2I back to state TAGC0I, ready for the next SVIN signal which will cause the loading of the BUS IN register with the next word of scan data.

The PPM0I state transitions to the PPM1I state upon the occurrence of the PPMIDV signal generated in state REGC2I. In state PPM1I, the request signal is generated and passed to the controller 10 in FIG. 1 (see also FIG. 6). When the grant signal comes back from controller 10, the PPM states change from PPM1I to PPM0I. At the same time, the register control states in logic 152 change from REGC2I to REGC0I. The receipt of the grant signal also causes generation of the time share cycle (TSC) signal at PH1 clock time (as previously described for latch 52 in FIG. 2). Similarly, the grant signal also triggers the generation of the MAR enable and MAR select signal (as previously described for ANDs 56 and 58 in FIG. 2). Typically the MAR select signal is a predetermined hardwire connection rather than a programmable selection. In other words, the I/O adapter will always generate the MAR Sel 2 signal that selects MAR 2. The AUTO-IN-PPMA states will continue to cycle as just described until the scanner module has completed sending data to PPM 16.

When the flow of video data is out of the PPM 16 and into the printer module, the states used in the state diagram of FIG. 10 are on the left hand side of the diagram. In this condition, the state transition from the start state to the TAGC0 state, the PPM0 state and the REGC0 state when an AUTO, a not-IN and a PPMA condition exists.

In the PPM0 state, the request signal is generated and sent to the controller 10. When the grant signal is returned by the controller to the data transfer control logic 152, the logic transitions to state PPM1. In the PPM1 state, the load PPM OUT signal (LDPPM0) is generated. This signal gates data received from the PPM 16 into the PPM OUT register 164.

The grant signal that causes the transition to PPM1 also generates the MAR enable and MAR select 2 signal (as previously described for FIG. 2). The grant signal gates the PPM OUT register to receive data and also gates the address from the selected MAR to retrieve the data from the PPM 16 that is read into the PPM OUT register 164.

At the next clock cycle, the transfer control logic 152 transitions from PPM1 to PPM2. In state PPM2, the transfer control logic generates the PPM OUT Data Valid (PPMODV) signal. The PPMODV signal is used to transition from state REGC0 to REGC1. In state REGC1, the load Bus Out (LDB0) signal is generated. The LDB0 signal enables BUS OUT register 166 to receive the data from PPM OUT register 164. The LDB0 signal also causes logic 152 to transition from state PPM2 to PPM0. In PPM0 state the next request signal In the next clock cycle the register control states transitions from REGC1 to REGC2. In state REGC2, the Bus Out Data Valid condition is generated.

In state TAGC0 logic 152 looks for the BODV condition and the SVIN signal from the printer module. When SVIN and BODV conditions are present, the logic 152 transitions from a state TAGC0 to TAGC1. In TAGC1 state the SVOUT signal is generated. The SVOUT signal, combined with the not-IN mode satisfies AND 173 and enables driver 146 to pass the contents of BUS OUT register 166 to the printer module. SVOUT also causes register control state to transition from REGC2 back to REGC0. Finally Finally, SVOUT signal is also sent to the printer module, and the printer module drops the SVIN signal. With the SVIN signal down or not present, logic 152 transitions from state TAGC1 back to state TAGC0. This sequence of states continues until the printer module receives all the video data it needs from PPM 16.

When an end-of-block condition is detected by the controller 10, the PPM Available (PPMA) bit is reset in the control register 154. The not-PPMA condition causes the logic to revert to the START state. The logic will stay in the START state until PPMA comes back and the AUTO mode comes back.

Figure 11:
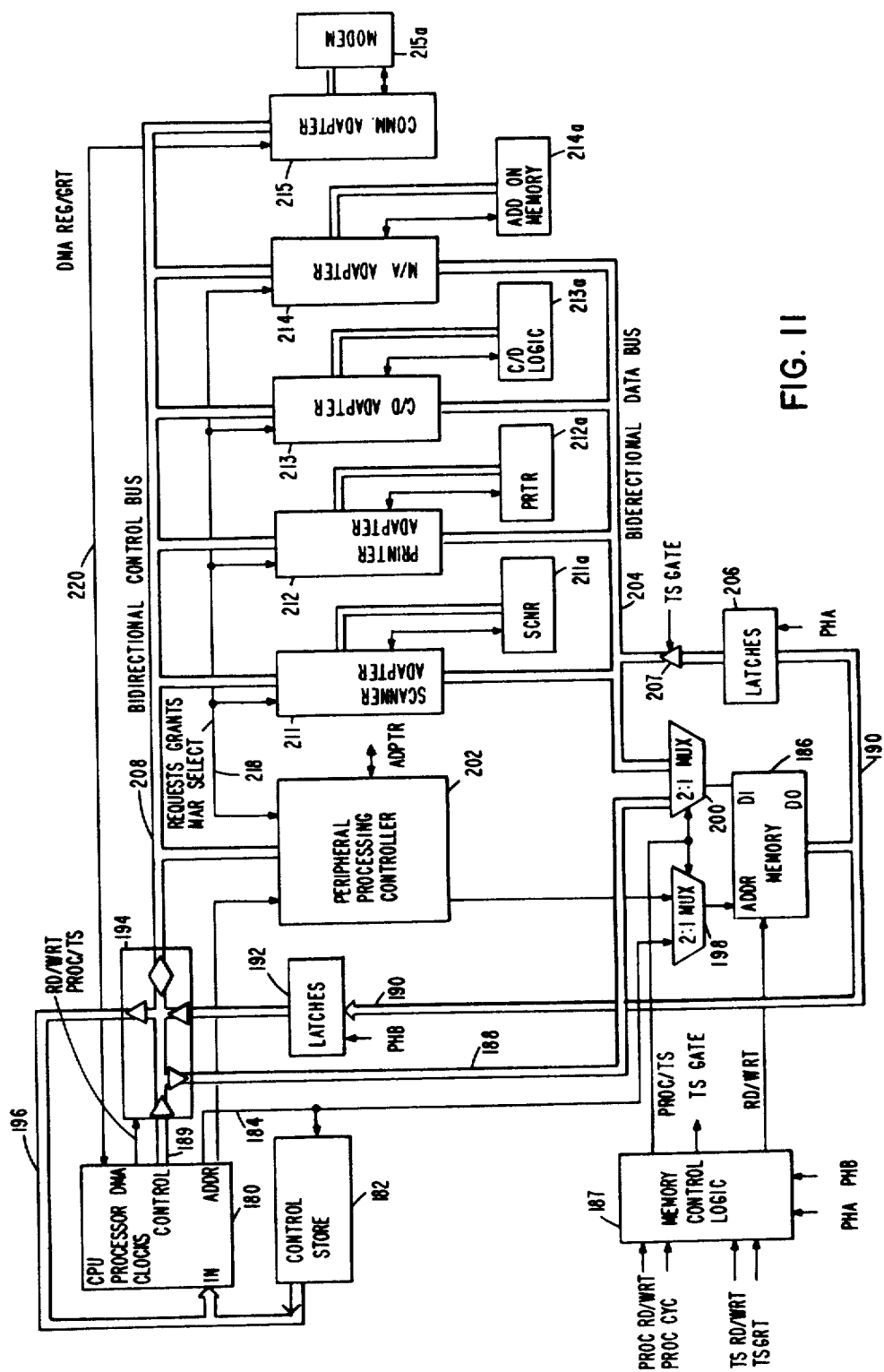
FIG. 11 shows an alternative embodiment of the invention where data processing is entirely accomplished by peripheral devices working with a memory under control of a peripheral processing controller.

Referring now to FIG. 11, an alternative embodiment of the invention is shown. In this embodiment, the peripheral devices still process data directly with a memory. However, the memory has a fixed amount of space allocated as work area memory for the CPU. Also, one of the devices communicates its data over the control bus rather than the data bus. Finally the peripheral processing controller uses fixed size memory blocks rather than programmable size blocks. The controller can be initialized by the CPU to select different regions of memory in which the fixed size blocks are located.

Just as in FIG. 1, the single lines indicated in FIG. 11 represent control lines interconnecting the functional blocks of the system. For example, control line 218 represents the requests, grants and MAR select signals that pass between the peripheral processing controller 202 and the adapters 211 through 214. The request/grant lines 220 from the communications adapter 215 go to the CPU 180. This is because the communications adapter is controlled by the CPU 180 instead of the peripheral processing controller 202 in this embodiment. Even though data flow to the communication adapter 215 is supervised by CPU 180, the CPU is not processing any video data used by the communication adapter. The CPU is simply controlling the flow of data between the communication adapter and the memory 186.

Memory 186 is accessed in alternate cycles by CPU 180 and by the peripheral processing controller 202. Memory control logic 187 performs this function. One of the memory cycles is gated by phase A clock time and the other is gated by phase B clock time. This is simply accomplished by using a latch that is set by PHA and reset by PHB. The output of the latch switches MUX's 198 and 200 as described hereinafter.

Memory control logic 187 also responds to Proc RD/WRT, Proc Cycle, TS RD/WRT and TSGRT. The Proc signals are from the CPU and indicate whether a read or write operation is required during a processor cycle. The TS signals are from controller 202 and indicate an adapter has been granted access to memory 186 and whether a read or write operation is desired. Control logic 187 decodes these signals to generate the TS Gate signal and the RD/WRT signal. The TS Gate signal is used to enable driver 207 to pass information to the adapters 211 to 214. The RD/WRT signal tells the memory whether a read or write operation is being performed.

In operation, CPU 180 can address control store 182 for program instructions. Control store 182 would typically be a read only store. The address information from CPU 180 goes out over lines 184 to the control store 182. The control store 182 then reads back into the in port of CPU 180 the control program stored in control store 182.

Memory 186 is preferably an 8K memory. A 1/2K of this memory is allocated to CPU 180. CPU 180 addresses its 1/2K portion of memory 186 via address lines 184. CPU 180 sends information to be stored in memory 186 over bus 189, through bus steering 194 and over bus 188. If the CPU is reading information from memory 186, it receives the information over bus 190 through latches 192, bus steering 194 and over input bus 196.

Memory 186 is accessed in alternate memory cycles either by the CPU 180 or by the peripheral devices. In one cycle, MUX 198 and MUX 200 are switched to pass addresses from the CPU to the memory 186 and data from the CPU to the memory 186. In the next cycle, MUX 198 and MUX 200 are switched to receive address information from MARs inside the peripheral processing controller 202 and data from the peripheral devices over data bus 204. Thus every other cycle of the memory is given to the CPU 180 to control. The other cycle is time-shared by all of the peripheral devices.

The output bus 190 from memory 186 goes to both latches 192 and latches 206. Latches 192 are loaded at PHB clock time while latches 206 are loaded at PHB clock time.

Bus steering 194 is provided to steer control information from the latches 192 or from the CPU 180 either to the bidirectional control bus 208 or to the input bus 196 of the CPU. When the CPU is reading its allocated space in memory 186, bus steering 194 steers the information from latches 192 to input bus 196 for the CPU. When the CPU is acting to give the communications adapter direct memory access during a CPU cycle of the memory, the bus steering steers the data received from latches 192 out on the bidirectional control bus 208 to the communications adapter 215. In this instance, the control bus 208 is carrying video information instead of control information. Similarly, when the communication adapter is sending video information received from the modem, the adapter sends the video information to the memory 186 via bus 208, bus steering 194 and bus 188.

If CPU 180 is reading control information from the adapters 211 through 215, bus steering is gated such that the control information coming over bidirectional control bus 208 is passed to input bus 196 for the CPU. If the CPU is writing control information to the controller 202 or the adapters 211 through 215, bus steering 194 passes the control information from output bus 189 of the CPU to bidirectional control bus 208. Thus the bus steering 194 consists of gated drive circuits driven by read/write signals or CPU/TS cycle allocations signals from CPU 180.

Figure 12:
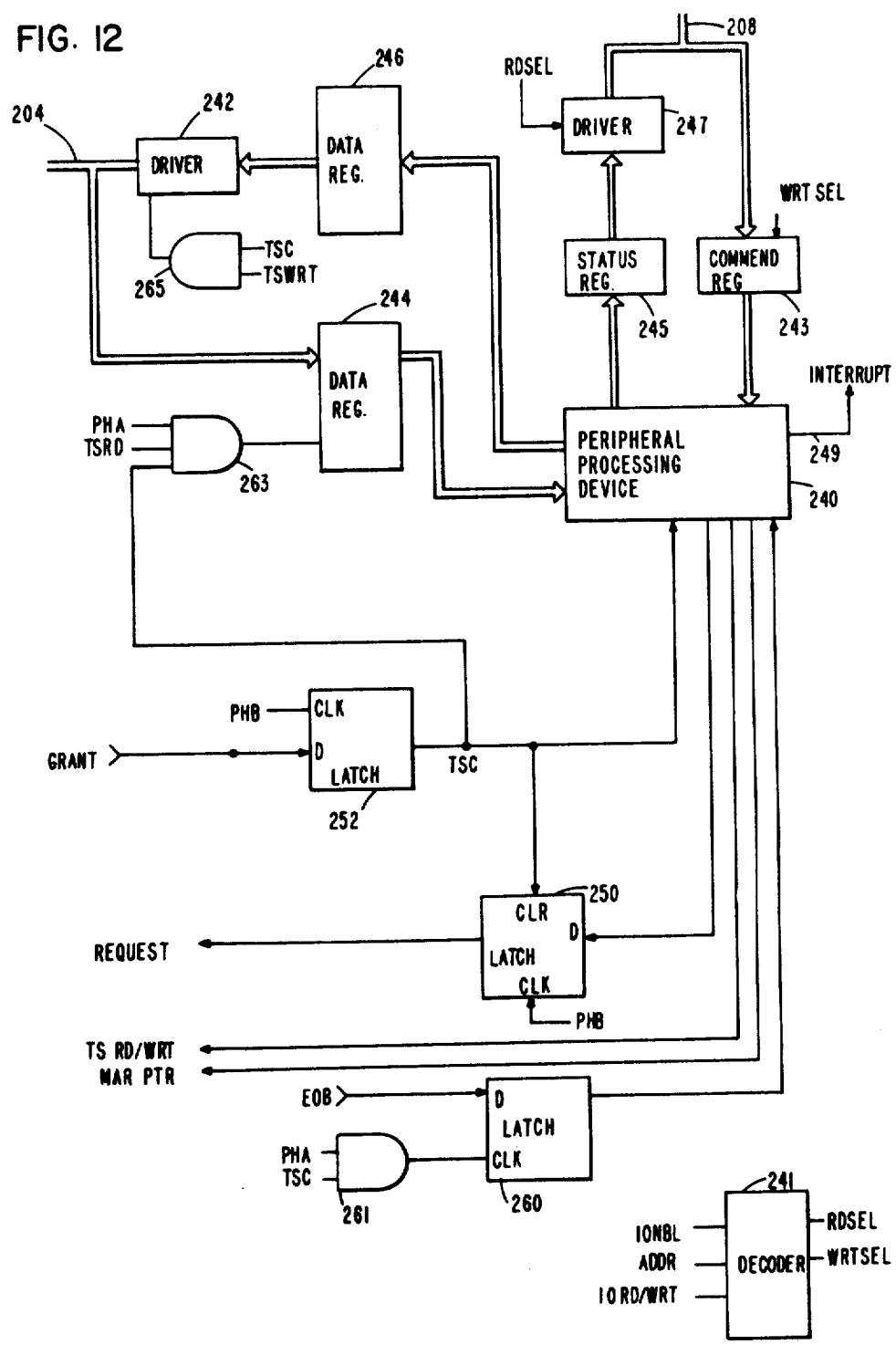
FIG. 12 shows the adapters used in FIG. 11.
Figure 13:
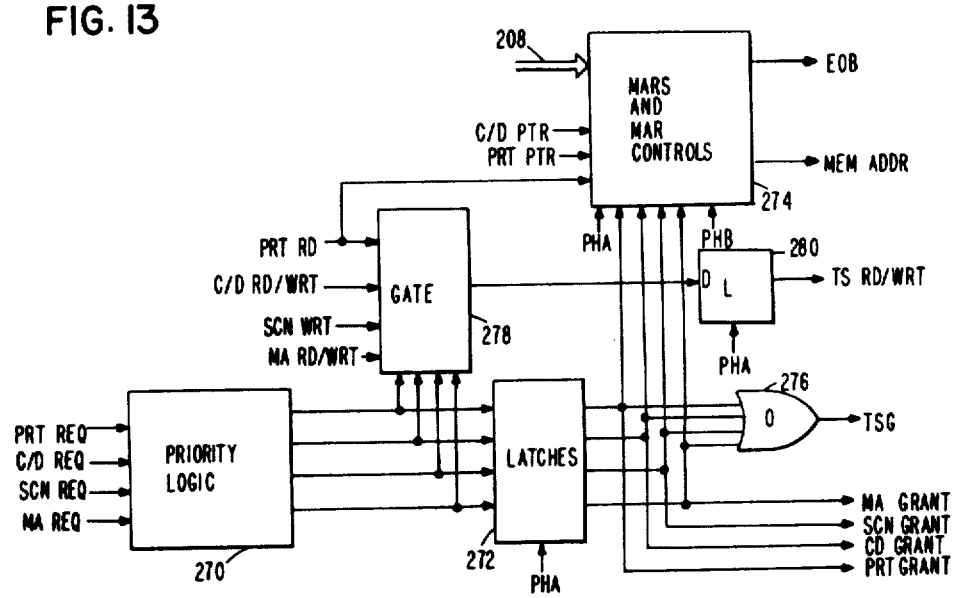
FIG. 13 shows the peripheral processing controller used in FIG. 11.

Each of the adapters 211 through 214 operate in substantially the same manner as previously described for FIG. 2. The slight differences will be discussed shortly with reference to FIGS. 12 and 13. FIG. 12 shows an adapter and FIG. 13 shows the peripheral processing controller 202. Each of the adapters 211 through 214 adapts the control bus and the data bus to interface with the hardware function performed by the peripheral device connected to the adapter. The scanner adapter 211, the printer adapter 212, the compression/decompression adapter 213 and the minimum attendance adapter 214 adapt these buses to connect them to scanner 211A, printer 212A, compression/decompression logic 213A and add-on-memory 214A. The minimum attendance buffer 214 and add-on-memory 214A are additional functions not previously shown in FIG. 1. The minimum attendance function merely provides additional storage space to store video data. Add-on-memory 214A, tape storage or disk storage might be used.

The communications adapter 215 connects the modem 215A to the control bus 208. As previously described, transmitted video data, instead of being passed over the data bus 204 to the communications adapter 215, is passed over the control bus 208 to the communications adapter 215. It is common to use a communication adapter attached to a single bus. Therefore, for this one adapter it may be more attractive to use an established communication adapter with a single bus for both data communications and control communications.

When a DMA (Direct Memory Access) cycle is granted by the CPU during the reading information between communication adapter 215 and memory 186, the data flow is over control bus 208, through bus steering 194 and over input memory bus 188. A DMA cycle occurs during a processor access cycle to memory 186 rather than during a time share (TS) access cycle. CPU 180 simply allocates its cycle for use by the communications adapter 215.

The function of the adapters 211-214 is similar to the function of the adapter in FIG. 2. However, the differences in detail may be more clearly seen by referring now to FIG. 12. FIG. 12 is an example of an adapter that may be used for any of the adapters 211 through 214.

The control information passing over bidirectional bus 208, goes to command register 243 or comes from status register 245 through driver 247. The processing logic or apparatus 240 responds to the commands 243 to perform the scanning, printing, compression or decompression or memory storage function depending upon the peripheral device represented. The commands that enable the driver 247 or the command register 243 are decoded by decoder 241. Decoder 241 receives the I/O enable (IONBL), the address of the register 243 or 245 and the I/O read/write signal, all from CPU 180. Decoder 241, command register 243, status register 245, driver 247 operate in substantially the same way as previously described for decoder 41, command register 43, status register 45 and driver 47 in FIG. 2. Peripheral processing apparatus 240 is slightly different in its generation of the time share read/write signal and the MAR select signal, as will be discussed hereinafter.

Data into or out of the peripheral processing apparatus goes through data registers 244 or 246. Incoming data is stored in data register 244 at PHA clock pulse time when there is a time shared cycle (TSC) signal and a time shared read (TSRD) signal present at AND 263. Data from the peripheral processing apparatus is buffered in register 246 before being driven out by driver 242. Driver 242 is enabled by AND 265 when there is a time shared cycle (TSC) and a time shared write (TSWRT) signal present.

The TSC signal is generated in response to the request-grant sequence. The request signal is triggered by the peripheral processing apparatus 240 applying a signal at the data input terminal of latch 250. At phase B clock time, the latch 250 sets and generates the request signal. The request signal goes to the controller 202 (FIG. 11). If the request is granted by the controller, the grant signal comes back to the data input terminal of latch 252. At phase B clock time if the grant signal comes up, latch 52 is set, and the time shared cycle signal is generated. At the next phase B clock time, latch 252 resets and the time shared cycle signal ends. The time shared cycle signal is also used to clear the request latch 250. Also, the time shared cycle signal is passed back to peripheral processing apparatus to indicate that a time shared cycle has been granted.

At the same time that the peripheral processing apparatus 240 generated the request signal to latch 250, it also generated the time shared read (TSRD) signal and the MAR pointer (MAR PTR) signal. These signals are passed to the controller 202 at the same time as the request. This differs from the adapter in FIG. 2 which did not pass these signals until the grant signal had been received back from the controller.

When the controller 202 (FIG. 11) detects that an end of block condition exists, the EOB signal is sent by the controller back to the adapter to the data input terminal of latch 260. If the EOB signal is present at latch 260, and AND gate 261 is enabled, latch 260 sets. AND 261 is enabled at phase A clock time if it is a time share cycle as indicated by latch 252. When latch 260 sets, it signals the peripheral processing apparatus 240 that an EOB condition has been detected at the controller. The processing apparatus 240 then sends an interrupt signal back to CPU 180 over line 249.

Referring now to FIG. 13, the peripheral processing controller 202 of FIG. 11 is shown. The memory address registers, MARS, and memory address register controls used in the controller of FIG. 13 are shown in detail in FIG. 14. The request signals from the adapters are processed by priority logic 270. The priority ranking from high to low is printer, compressor/decompressor, scanner and minimum attendance. Priority logic 270 will have a signal on one of its four output lines indicating the request representing the highest priority. The signal on one of the lines from the logic 270 sets one of the latches 272 at PHA clock time. Grant latches 272 indicate which adapter has been granted access. Each of the grant lines is passed to the MAR controls 274 and to OR 276. OR 276 indicates a time share grant has been generated.

The output from the priority logic 270 also enables a gate 278 which passes a read/write signal to latch 280. Latch 280 is set by the phase A clock signal and indicates whether a time share read condition or a time share write condition exists. The TSRD or TSWRT signal goes to memory control logic 187 (FIG. 11) to control memory read or write. Since the printer is only going to read data, it only has a print read signal as input to gate 278. Similarly, since the scanner is only going to write data into memory, it only has a scan write signal into gate 278.

MAR controls 274 in addition to receiving the grant signals, also receive pointer signals. A compress/decompress, two-bit pointer (C/D PTR) and a printer pointer (PRT PTR) signal are received from adapters 213 and 212, respectively. In addition, the print read signal is passed to the MAR controls also as a pointer. These signals point to MARS which are to be selected by the MAR controls. The MARs and MAR controls also receive control information over the control bus 208. The MAR controls generate the memory address signal which is passed to MUX 198 (FIG. 11) to address the byte in memory 186 which is desired. The MAR controls also generate the end of block (EOB) signal which is passed back to the adapters.

Figure 14:
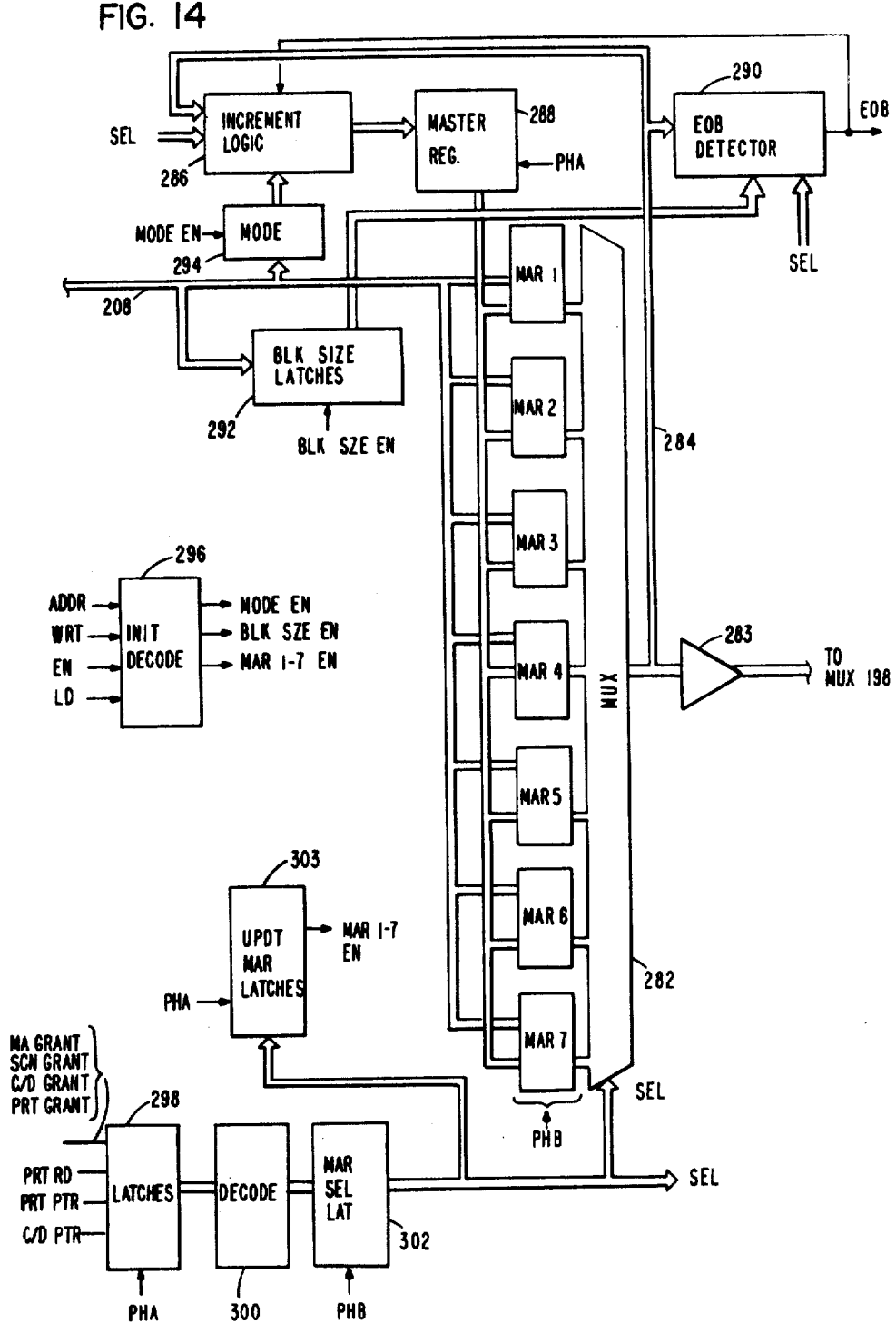
FIG. 14 shows the MAR's and MAR controls 274 used in FIG. 13.

The MARS and MAR control are shown in detail in FIG. 14. A selected MAR is used to address a section of memory until a block of data has been processed by a peripheral device through its adapter. The MAR leads the device through a block of memory by having the address of the memory updated in the MAR during each memory access cycle. Accordingly, as the contents of the MAR are read out through MUX 282 to address the memory 186, they are also fed back over bus 284 to increment logic 286. In the increment logic, the address is incremented by one and stored in the master register 288. The updated address for the selected MAR is then loaded back into its MAR at the phase B clock time.

The increment logic 286 not only increments the low order count representative of the address, but can also be used to increment the region portion of the address. Thus, the increment logic 286 not only advances memory access through a block of memory, it also may be used to jump memory access between blocks of memory and start new blocks of memory for access. The operation of the increment logic will be described hereinafter with reference to FIG. 16.

The memory addresses from the MARS are also passed to the end of block detector 290. The EOB detector may be set to predetermined block sizes. Then, depending upon the mode of operation, detector 290 will look for specific address counts to indicate an end of block condition. The EOB condition goes back to the adapter and is also used by the increment logic as will be discussed hereinafter.

The size of the block detected by the end of block detector 290, is specified by the block size loaded into latches 292 by computer 180 over bus 208. The computer 180 also sets up the mode register 294 over bus 208. The mode register indicates the mode of operation to the increment logic. By this means, the MARS may be programmably controlled to perform different predetermined block size operations and to move data between blocks.

All the initialization of the MARS and MAR controls in FIG. 14 is accomplished by CPU 180. The command lines, address (ADDR), write (WRT), enable (EN) and load (LD) all come from CPU 180 to initial decode 296. Initial decode then generates the mode enable (MODE EN) signal to load the mode information into mode register 294. Decode 296 also generates the block size enable (BLK SZE EN) signal to load the block size word from CPU 180 into latches 292. Decode 296 also generates a MAR 1-7 EN (enable) signal to load the initial addresses into MARS 1 through MAR 7. The initial addresses of these MARS in the low order eight bits is always 0. The higher order five bits may be controlled by CPU 180 to specify different regions of memory to which the MARS will grant access.

After initialization, the adapters select MARS through the latches 298. Latches 298 at phase A clock time store the grant signal and the pointer signal received from latches 272 in FIG. 13. These signals are decoded by decoder 300 to generate the MAR select (SEL) signal. The MAR select latches are set at phase B clock time. The output of the MAR select latches selects the MAR which is passed by MUX 282 to driver 283 for addressing the memory. The MAR select signal also is passed to the update MAR latches 303 and loaded therein at phase A clock time. The output of the update MAR latches is used to enable selected MAR 1-7 at PHB time to update its contents with the updated address from master register 288.

Thus the sequence of operations is as follows. A selected MAR, say MAR 5, passes its address out to the memory through driver 283. The address in MAR 5 is also fed back to increment logic 286. Increment logic 286 advances the address and applies it to master register 288. At phase A clock time, master register 288 loads the updated address. Also at phase A time, the update MAR latches 303 are set, and the selected MAR (MAR 5) is enabled to receive the updated address from master register 288 by the next PHB clock signal. All of the MAR's receive the PHB clock signal and the MAR enabled by latches 303 is updated. Thus, in one phase B to phase B cycle the address from MAR 5 has gone to the memory and the new updated address has been loaded back into MAR 5.

Figure 15:
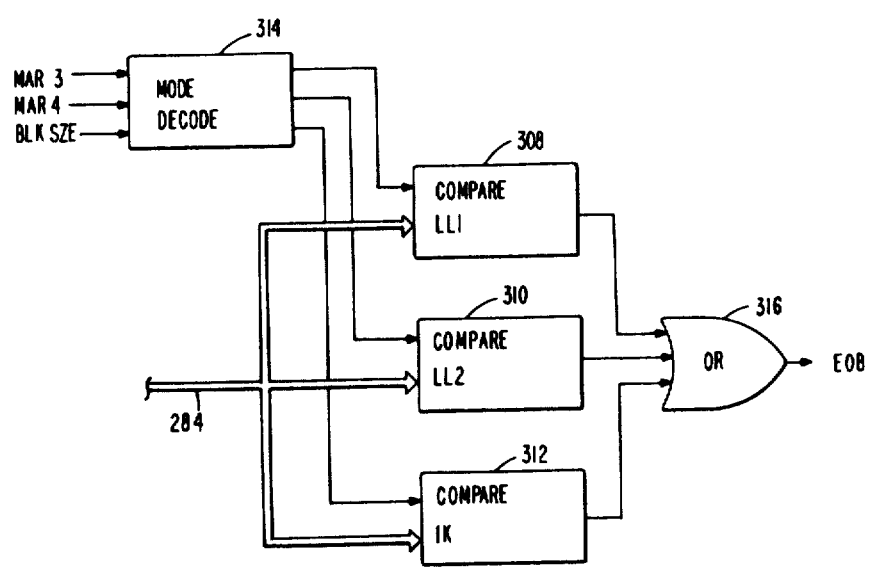
FIG. 15 shows the end-of-block detection apparatus used in MAR controls 274 of FIG. 13.
Figure 16:
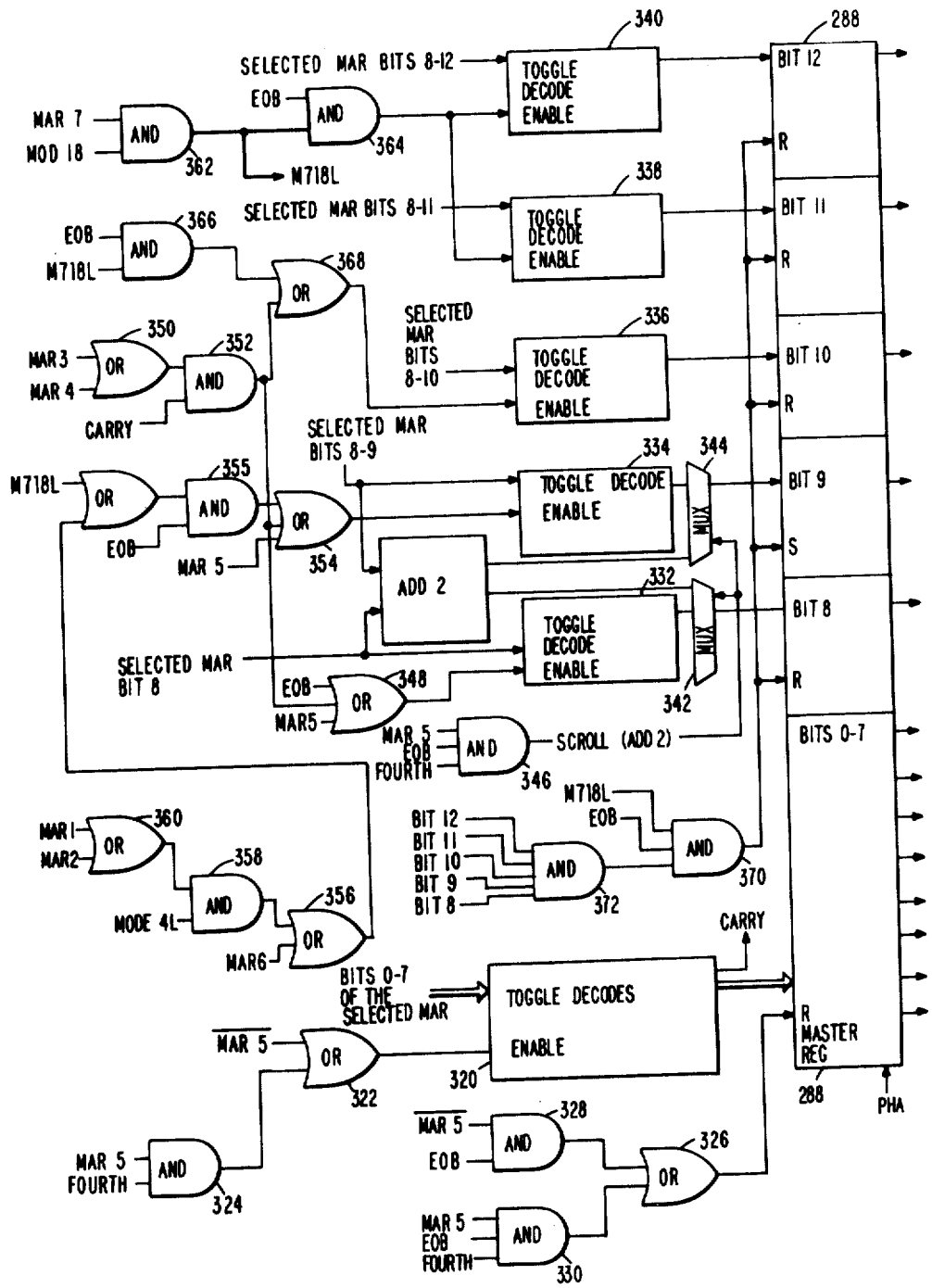
FIG. 16 shows the increment logic 286 and master register 288 used in FIG. 14.

The EOB detector 290 and the increment logic 286 of FIG. 14 are shown in detail in FIGS. 15 and 16, respectively. The end of block detection in FIG. 15 is performed by comparing the address from the selected MAR to predetermined values set in the comparators. Comparators 308 and 310 look for block sizes corresponding to two different line lengths, LL1 and LL2. These lengths correspond to the number of bytes required to store all the picture elements (PELs), black and white dots, in a line of the image. The two lengths might correspond to different resolution sizes but more typically correspond to different widths of images being processed. Comparator 312 has nothing to do with line lengths and is simply a compare on a 1K block size in the memory (1K equals 1,024 bytes).

The active comparator is selected by mode decode 314. Inputs to this decode are the MAR 3 or MAR 4 SEL signal plus the block size from latches 292 in FIG. 14. As will be discussed hereinafter MARS 3 and 4 use the 1K block size. The block size signal indicates the line length and is used to enable either compare 308 or compare 310. Whichever compare is enabled, OR 316 collects their outputs to generate the EOB signal.

Figure 17B:
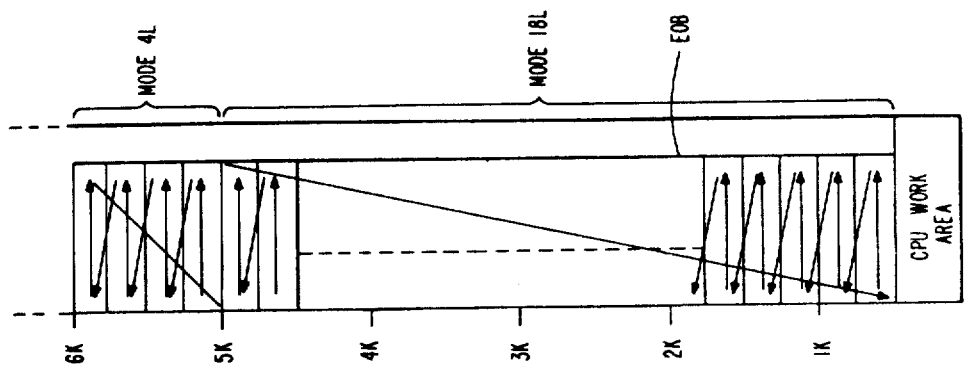
FIGS. 17A and 17B are example maps of memory space use as controlled by the peripheral processing controller.

To understand the increment logic, it is first necessary to understand the modes of addressing the memory and the effect of these modes on memory space. Maps of memory space in various modes of operation are shown in FIGS. 17A and 17B.

There are five modes or sequences of utilization of the memory space. Some of these modes are selectable by loading mode bits into mode latches 294 (FIG. 14). Other modes are simply preassigned to a given MAR and are triggered by the MAR select signal from latches 302 (FIG. 14). The five modes are 2L, 4L, 18L, 2K and 4S.

Mode 2L indicates that two lines of imaged data are being processed. An example of the mode 2L use of memory space is shown in FIG. 17A. The address for a location in memory is specified by 13 bits read from one of the MARs. The lower order eight bits are always set to zero at the beginning of a block. To address different positions of the memory for that block, the highest order five bits are changed. In mode 2L, the lowest order eight bits are incremented by one until processings works its way through one line of the image data and an end of block condition is detected. Upon detecting end of block, bits 0-7 are reset to zero and bit eight is toggled to its opposite state.

Figure 17A:
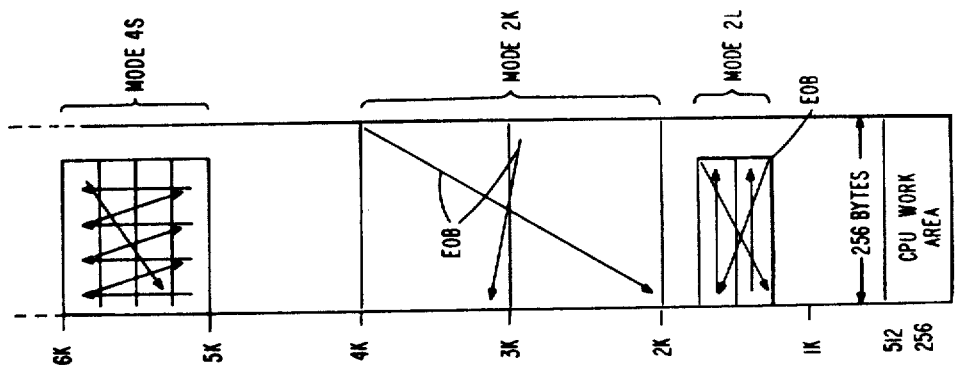

As depicted from mode 2L in FIG. 17A, a line will be processed until an end of block condition is detected and then memory access ping-pongs between two lines. Note that as represented, each line had a capacity of 256 bytes, however, the line length LL1 or LL2, whichever is selected, is less than 256 bytes and thus the end of block condition occurs before end of a 256 byte section in memory.

The mode 2K use of memory space is substantially the same as the mode 2L use except the block size is much bigger. In mode 2L the block size is one line length of image data; in mode 2K the block size is 1K (1,024 bytes). A mode 2K utilization is depicted between the 2K and 4K address positions in FIG. 17A. Data is processed through a full 1K section of memory. At the end of the 1K section, an end of block condition is detected and the start address jumps to the beginning of the next 1K section. In other words, the 1K sections are used in ping-pong fashion just as the 2L mode uses two lines in ping-pong fashion. In mode 2K bites 0-8 are used and incremented and the start of a new section or the ping-ponging between sections is accomplished by toggling bit 9.

Mode 4L usage of the memory is depicted in FIG. 17B. In mode 4L, four lines of memory are processed serially, and then the address flies back from the last position on the fourth line to the first position of the first line. Mode 18L is also indicated in FIG. 17B. It is similar in operation to mode 4L except that 18 lines of image data are stored. In mode 4L the memory is addressed to each line by using bits eight and nine. In mode 18L, the memory works its way through the lines by utilizing all of the higher order five bits to sequentially address the lines.

Mode 4S is indicated in FIG. 17A. Mode 4S is utilized to scroll four lines of data. In other words, after four lines of data have been processed, the oldest line is overwritten with a new line of image data. During image processing, all four lines are reviewed. This is indicated by the vertical arrows in the mode 4S memory map in FIG. 17A. The scrolling is represented by the fact that the flyback at the end of the block goes to the second line rather than the first line, reading from bottom to top in the map. This assumes that the bottommost line is the oldest line and is thus overwritten. Then when vertical processing of the data through the four lines begins again, the last line processed becomes the bottommost line rather than the topmost line. Manipulation of data in the memory in this way is useful in processing image data to enhance the image.

The sequencing of the addresses to access the memory, as depicted in the various modes shown in FIGS. 17A and 17B is accomplished by the increment logic, working with the master register, as shown in FIG. 16. Toggle decode circuits are used to increment the address bits from the selected MAR before they are loaded into the master register 288.

A toggle decode circuit is simply a count increment circuit that toggles its assigned bit if all bits lower than its assigned bit are binary one. Otherwise, it passes its assigned bit straight through. Basically, toggle decodes are used to build a counter that does not have ripple carries. Each bit of the increment logic looks at all the lower order bits and all bits are simultaneously changed. This means the count operation can be performed more rapidly than if the counter had to wait for carries to ripple through it.

In FIG. 16, the increment logic with the master register is broken into two separate counters. One counter implements bits 0-7 and is effectively an eight bit counter. The other counter is a five bit counter for MAR bits 8 through 12 and is selectable in the modes 2L, 4L, 18L, 2K and 4S.

The logic in FIG. 16 that enables the toggle decode is dependent upon the MAR selected as indicated by latches 302 (FIG. 14) and the mode as indicated by mode latches 294 (FIG. 14). As discussed earlier, some MARS have preselected modes of operation while other MARS may be operated with the increment logic in selectable modes.

In the present embodiment, the MARS and modes are paired as follows. MARS 1 and 2 are assigned to the compression/decompression adapter and may be used in either mode 2L or mode 4L. MAR 3 is assigned to the compression/decompression adapter and operates in mode 2K. MAR 4 is assigned to the minimum attendance adapter and operates only in mode 2K. MAR 5 is assigned to the printer adapter and operates only in mode 4S. MAR 6 is assigned to the scanner adapter and operates only in mode 4L. MAR 7 is assigned to the scanner adapter or the communication adapter and operates selectively either in mode 2L or mode 18L.

Now looking at FIG. 16, toggle decodes 320 are enabled to increment bits 0 through 7 of the selected MAR. The enabling signal comes from OR 322 which will have an output whenever MAR 5 is not selected. If MAR 5 is selected, then OR 322 will have an output only if AND 324 indicates that a fourth line has been processed when MAR 5 is selected. This is due to the fact that MAR 5 operates only in mode 4S.

In mode 4S, bits 0-7 are incremented only every fourth byte address. This is because in mode 4S the image data is scanned vertically through four lines before the image data is processed (see mode 4S in FIG. 17A). Bits 0-7 of the MAR register are reset by OR 326. OR 326 collects outputs from ANDS 328 and 330. AND 328 has an output when MAR 5 has not been selected and an end of block condition is detected. This, in effect, is an end of line or end of block condition which causes the lower eight bits to be reset to zero. In mode 4S, the lower eight bits are not reset to zero until an end of block occurs at the end of a four byte vertical scan. Accordingly, AND 330 has an output in MAR 5 if there is an EOB signal and a FOURTH signal.

Figure 18:
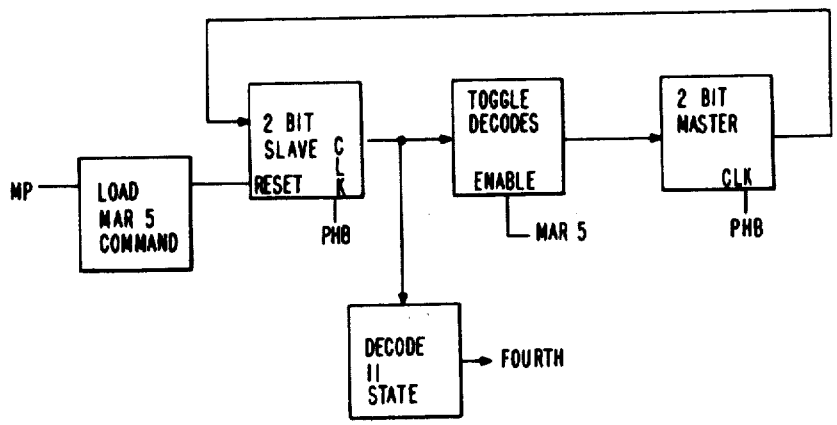
FIG. 18 shows a usage counter that generates the FOURTH access signal used in FIG. 16.

The FOURTH signal referred to is generated by the usage counter shown in FIG. 18 that counts four accesses to the memory. The counter is made up of a 2-bit master register, a 2-bit slave register and toggle decodes to increment the count from the slave to the master register. The counter is reset to zero when MAR 5 is initialized and is incremented by one each time MAR 5 is selected to to access the memory. Every fourth access is decoded from the counter to generate the FOURTH signal used in FIG. 16.

As mentioned earlier, the high order five bits in MAR address are processed by the five bit counter operating on address bits 8-12 in FIG. 16.

In the different modes, different portions of the five bit counter formed by bits 8 through 12 are used. In mode 2L, only toggle decode 332 and bit 8 are used. In mode 2K only decode 336 and bit 10 are used to perform the ping-ponging between the two 1K blocks. Bits 8 and 9 are used in this mode in addition to bits 0 through 7 as part of the regular incrementing through the 1K block. In mode 4L or 4S, toggle decodes 332 and 334 are used with bits 8 and 9. In mode 18L, all five toggle decodes 332, 334, 336, 338 and 340 are used with all five bit positions 8 through 12 of the upper five bits in master register 288.

MUXs 342 and 344 are only used to select between MAR 5 operation (mode 4S) and all other operations. These MUXs are switched by AND 346. AND 346 generates a scroll output signal when there is a MAR 5 and an end of block condition and a FOURTH signal. This causes bits 8 and 9 to be incremented by 2 instead of being incremented by 1 before they are loaded into master bit positions 8 and 9. This is due to the scroll operation as depicted in mode 4S in FIG. 17A. At the end of the four line scan in mode 4S instead of returning to the first line, memory accessing returns to the second line.

As shown in FIG. 16, toggle decode 332 is enabled to toggle selected MAR bit 8 any time there is an end of block indication or if a carry signal is generated by toggle decodes 320 when MAR 3 or MAR 4 have been selected (OR 350, AND 352).

Finally, OR 348 enables toggle decode 332 if MAR 5 has been selected. When MAR 5 is selected, OR 354 also passes the MAR 5 select signal to enable toggle decode 334. Toggle decode 334 is also enabled when there is an end of block condition detected during mode 4L or mode 4S. Mode 4L is detected by OR 356 when MAR 6 is selected or when there is a mode 4L condition from mode latch 294 (FIG. 14) during MAR 1 or MAR 2 selection (AND 358, OR 360).

AND 355 is also enabled to pass the end of block condition to enable toggle decode 334 if MAR 7 has been selected and mode 18L has been set in the mode register 294 (FIG. 14). The MAR 7 mode 18L (M718L) condition is detected by AND 362 which is shown enabling AND 364 adjacent toggle decode 340. Toggle decodes 336, 338 and 340 are all enabled during the MAR 7 mode 18L condition. Toggle decode 340 is enabled during this time by an end of block condition being passed by AND 364. Similarly, toggle decode 338 is enabled by AND 364. Toggle decode 336 is enabled by end of block condition being passed by AND 366 and OR 368.

Toggle decode 336 is also enabled during mode 2K. In mode 2K, (MARS 3 and 4), the carry signal from toggle decodes 320 generates the enable signal which is passed by OR 368 to toggle decode 336.

Also, when MAR 7 and mode 18L are selected, master bits 8 through 12 are preset so that as five bits, they represent the count of two. The count of two is the starting point for mode 18L. This reset condition is detected by ANDS 370 and 372. AND gate 370 is enabled by the M718L signal by the end of block signal and by a count of 19 in input bits 8 through 12. The input bit count of 19 is detected by AND 372.

A particular increment logic has been shown in FIG. 16 to rapidly implement without ripple carries, the sequences of memory accessing mapped in FIGS. 17A and 17B. However, it will appreciated by one skilled in the art that many alternative counting techniques and incrementing logic techniques may be utilized to perform the sequences.

While we have illustrated and described the preferred embodiments of our invention, it is understood that we do not limit ourselves to the precise constructions herein disclosed and the right is reserved to all changes and modifications coming within the scope of the invention as defined in the appended claims.

What is claimed is:

1. In a data processing system having a central processor for generating job control information and memory access control information, a peripheral data-processing subsystem for processing data, said subsystem comprising:
   a plurality of peripheral processing devices responsive to job control information from said central processor, each device having means for specialized-job processing of data to accomplish a portion of the data processing to be completed by the system;
   shared storage means sharing an access connection to each of said peripheral processing devices, for storing data for processing by said peripheral processing devices;
   control means, responsive to the memory access control information from said central processor, for controlling access to said storage means over said shared access connection by each of said peripheral processing devices so that a plurality of peripheral processing devices process blocks of data in said shared storage means simultaneously;
   said peripheral processing devices initialized by the job control information to execute multiple peripheral data processing jobs in parallel;
   said control means being initialized by the memory access control information to control memory accesses by each peripheral processing device during the execution of each data processing job.

2. The apparatus of claim 1 wherein:
   said control means notifies each peripheral processing device when all data in its assigned block has been processed.

3. The apparatus of claim 1 wherein:
   said control means is initialized by the memory access control information from the central processing unit to access said storage means so that data processed in a block of space in said storage means by one peripheral device is subsequently loaded into another block of space for processing by another peripheral device whereby data is processed through said storage means by a plurality of peripheral devices in a pipeline manner.

4. A data processing system for processing data in peripheral devices, said system comprising:
   a supervisory processing unit for generating job control information and memory access control information;
   a memory;
   a plurality of peripheral data-processing devices;
   a data channel connecting said peripheral devices to said memory;
   a peripheral processing controller for controlling access to said memory by said peripheral device;
   a control channel connecting the supervisory processing unit to said peripheral devices and to said controller;
   each of said peripheral devices being initialized by job control information over said control channel from said supervisory processing unit;
   said controller being initialized by memory access control information over said control channel from said supervisory processing unit;
   each of said peripheral devices responsive to the job control information performing a data processing job with data in said memory accessed over said data channel as controlled by said controller in response to the memory access control information.

5. The system of claim 4 for processing facsimile data representing images of documents wherein said peripheral devices include:
   scanning/printing means for inputting and outputting the facsimile data;
   transceiving means for transmitting and receiving the facsimile data.

6. The system of claim 5 wherein said peripheral devices further include:
   compressing/decompressing means for reducing the facsimile data transmitted and for restoring received data that has been compressed.

7. The system of claim 6 wherein:
   said controller, said scanning/printing means, said compressing/decompressing means and said transceiving means are initialized by the supervisory processing unit to configure the system as a scanner, data compressor and transmitter.

8. The system of claim 6 wherein:
   said controller and said scanning/printing means, said compressing/decompressing means and said transceiving means are initialized by the supervisory processing unit to configure the system as a receiver, data decompressor and printer.

9. The system of claim 6 wherein said peripheral devices further include:
encryption/decryption means for coding the facsimile data transmitted and for decoding received data that has been coded.

10. The system of claim 9 wherein:
said controller, said scanning/printing means, said compressing/decompressing means, said encrypting/decrypting means and said transceiving means are initialized by the supervisory processing unit to configure the system as a scanner, data encoder, data compressor and transmitter.

11. The system of claim 9 wherein:
said controller, said scanning/printing means, said compressing/decompressing means, said encrypting/decrypting means and said transceiving means are initialized by the supervisory processing unit to configure the system as a receiver, data decompressor, data decoder and printer.

12. A data processing system for processing large volumes of data in parallel to complete a system task, said system comprising:
a plurality of specialized data-processing means, each of said specialized data-processing means for processing data to complete an assigned job in the system task;
a shared memory means for storing in assigned memory spaces the data being processed by each of said specialized data-processing means;
a supervisory processing unit for generating configuration control information and memory access control information, said configuration control information defining the assigned job to be performed by each of said specialized data-processing means, and said memory access control information defining the memory space in said shared memory means assigned to each of said specialized data-processing means;
a peripheral processing control means responsive to said memory access control information for controlling access by each of said specialized data-processing means to an assigned memory space in said shared memory means;
each of said specialized data-processing means, initialized by said configuration control information, to request access to said shared memory means and to perform an assigned data-processing job with data in an assigned memory space under control of said peripheral processing control means;
said peripheral processing control means responsive to the memory access requests from each of said specialized data-processing means for granting each of said specialized data-processing means access to its assigned memory space.

13. The apparatus of claim 12 and in addition:
said peripheral processing control means passing an end-of-memory space signal to the specialized data processing means requesting access after said specialized means has been granted access to the last portion of its assigned memory space;
each of said specialized data-processing means responsive to an end-of-memory space signal for generating an interrupt signal for said supervisory processing unit;
said supervisory processing unit responsive to the interrupt signal for generating new configuration control information for the specialized data-processing means, that generated the interrupt signal, and for generating new memory access control information for said peripheral processing control means.

14. The system of claim 12 wherein said peripheral processing control means comprises:
a plurality of memory access control means, each memory access control means associated with one of said specialized data-processing means;
an end-of-memory space detecting means for detecting when each memory access control means has accessed the last portion of memory space assigned to the specialized data-processing means associated with that access control means.

15. The system of claim 14 wherein:
each of said memory access control means is initialized by the memory access control information to the address in said shared memory means corresponding to the beginning of memory space assigned to the specialized data-processing means associated with the memory access control means;
said detecting means is initialized by said memory access control information with an end-of-memory space code defining the end-of-memory space for each of said specialized data-processing means.

16. The system of claim 15 and in addition:
each of said specialized data-processing means is initialized by said configuration control information to point to one of said memory access control means in said peripheral processing control means as the access control means that controls shared memory access by that specialized data-processing means.

17. The system of claim 12 wherein:
each of said specialized data-processing means is assigned a predetermined priority rank for its memory access requests;
said peripheral processing control means further comprises a priority request decoding means for granting access requests by each of said specialized data-processing means in accordance with the priority assigned to the request.

* * * * *